(12) United States Patent
Wang

(10) Patent No.: US 7,870,161 B2
(45) Date of Patent: Jan. 11, 2011

(54) FAST SIGNATURE SCAN

(75) Inventor: Qiang Wang, 92 Churchill Ave., Palo Alto, CA (US) 94306

(73) Assignee: Qiang Wang, Palo Alto, CA (US)

( * ) Notice: Subject to any disclaimer, the term of this patent is extended or adjusted under 35 U.S.C. 154(b) by 198 days.

(21) Appl. No.: 12/254,676

(22) Filed: Oct. 20, 2008

(65) Prior Publication Data

US 2009/0100055 A1  Apr. 16, 2009

Related U.S. Application Data

(63) Continuation-in-part of application No. 10/982,057, filed on Nov. 5, 2004, now Pat. No. 7,454,418.

(60) Provisional application No. 60/518,032, filed on Nov. 7, 2003.

(51) Int. Cl.
G06F 17/20 (2006.01)
G06F 15/16 (2006.01)

(52) U.S. Cl. ........................................ 707/801; 726/25

(58) Field of Classification Search .................. 707/801; 726/25
See application file for complete search history.

(56) References Cited

U.S. PATENT DOCUMENTS

| 5,452,442 | A | 9/1995 | Kephart |
| 5,623,600 | A | 4/1997 | Ji et al. |
| 5,778,395 | A | 7/1998 | Whiting et al. |
| 2003/0021419 | A1 | 1/2003 | Hansen et al. |
| 2004/0117037 | A1 | 6/2004 | Hinshaw et al. |
| 2005/0086520 | A1 | 4/2005 | Dharmapurikar et al. |

OTHER PUBLICATIONS

Bloom, "Space/Time Trade-offs in Hash Coding with Allowable Error", *Communications of the ACM*, vol. 13, No. 7, pp. 422-426, 1970.

Ramakrishna et al., "A Performance Study of Hashing Functions for Hardware Applications", *Proc. ICCI'94 International Conference on Computing and Information*, pp. 1621-1636, 1994.

Boyer et al., "A Fast String Searching Algorithm", *Communications of the ACM*, vol. 20, No. 10, pp. 762-772, 1977.

(Continued)

*Primary Examiner*—John E Breene
*Assistant Examiner*—Alex Gofman

(57) ABSTRACT

Systems and methods for scanning signatures in a string field. In one implementation, the invention provides a method for signature scanning. The method includes processing one or more signatures into one or more formats that include one or more fingerprints and one or more follow-on search data structures for each fixed-size signature or signature substring such that the number of fingerprints for each fixed-size signature or signature substring is equal to a step size for a signature scanning operation and the particular fixed-size signature or signature substring is identifiable at any location within any string fields to be scanned, receiving a particular string field, identifying any signatures included in the particular string field including scanning for the fingerprints for each scan step size and searching for the follow-on search data structures at the locations where one or more fingerprints are found, and outputting any identified signatures.

30 Claims, 13 Drawing Sheets

OTHER PUBLICATIONS

Karp et al., "Efficient Randomized Pattern-Matching Algorithms", *IBM J. Res. Develop.*, vol. 31, No. 2, pp. 249-260, 1987.

Wu et al., "Fast Text Searching with Errors", *Communications of the ACM*, vol. 35, pp. 83-91, 1992.

Wu et al., "A Fast Algorithm for Multi-Pattern Searching" research paper, pp. 1-11, 1994.

Hutchings et al., "Assisting Network Intrusion Detection with Reconfigurable Hardware", *Proceedings of the ICEE FCCM'02*, 2002.

Sidhu et al., "Fast Regular Expression Matching Using FPGAs", *Proceedings of IEEE FCCM*, 2001.

Cho et al., "A Fast Regular Expression Indexing Engine", *In Proceedings of ICDE*, 2002.

Dharmapurikar et al., "Deep Packet Inspection Using Parallel Bloom Filters", *Symposium on High Performance Interconnects*, pp. 44-51, 2003.

Lockwood et al., "An Extensible, System-on-Programmable-Chip, Content Aware Internet Firewall", *MAPLD*, 2003.

{HASH VAL0, HASH VAL1, ..., HASH VALI}
= {{HASH VAL0A, HASH VAL0B}, HASH VAL1, ..., HASH VALI}

WHEN TYPE = 0, SID = STRING ID - 364
WHEN TYPE = 1, SID = SIGNATURE ID - 366

FAST SIGNATURE SCAN

CROSS-REFERENCE TO RELATED APPLICATIONS

This application claims priority to U.S. patent application Ser. No. 10/982,057, which was filed on Nov. 5, 2004, which claims the benefit under 35 U.S.C. §119 to U.S. Provisional Patent Application Ser. No. 60/518,032, which was filed on Nov. 7, 2003. The disclosure of the above applications are incorporated herein by reference in their entirety.

BACKGROUND

The present invention relates to scanning signatures in a string field.

A digital content entity (e.g., a file, a program, a web page, an email, an IP package, or a digital image) can include one or more string fields. A string field is a string of data values that typically stand for characters or execution codes. For example an IP packet can include URL, HOST, HTTP header, HTTP payload, email attachments, email header, and email payload fields. The size of a string field can vary from a few bytes to a few million bytes or more. A string signature is either a particular fully-specified sequence of data values or a particular expression (e.g., a particular regular expression) of data values identifying a string object (e.g., a particular computer virus or a specific genetic sequence). String signatures can be stored in a string signature database. The string signature database can include multiple string signatures. The size of a single string signature can vary from a few bytes to thousands of bytes.

Both string signatures and string field are bit strings that can include many basic units. A basic unit is a smallest unit having a semantic meaning, and is therefore used as a scanning unit in conventional string signature scan techniques. A size of the basic unit can vary with application. For example, a basic unit of English text strings is typically 8 bits (i.e., one byte) while a basic unit of a computer virus signature is typically a byte or a half byte.

Each basic unit in a particular string signature can be specified as equal or unequal to a specific value, or a range of values (e.g., a numerical character or an alphabetic character can have a specific value or a range of values such as 0-9 or a-z). The basic unit can be specified to be either case-sensitive or case-insensitive. The string signature can support simple logic operations (e.g., negation). Furthermore, each string signature can include a wildcard designated by, for example, a "*" (a "variable-size" symbol) or "?" (a fixed-size symbol), where "*" indicates zero or more arbitrary basic units and "?" indicates a single arbitrary basic unit. For each variable-size symbol, a range of arbitrary basic units can be further specified. When a string signature includes the variable-size symbol, the size of the string signature is variable. If the string signature does not include a variable-size symbol, the size of the string signature is fixed.

A typical signature scan process can include comparing a string field against corresponding string signatures in a database for all possible locations within the string field. The scan speed is typically limited by signature size and complexity. In addition, scan speed can be limited by the ability to update the signatures incrementally.

SUMMARY

Systems and methods for scanning signatures in a string field. In general, one aspect of the subject matter described in this specification can be embodied in methods for string signature scanning that include the actions of processing one or more signatures into one or more formats that include one or more fingerprints and one or more follow-on search data structures for each fixed-size signature or each fixed-size signature substring of a variable-size signature, the one or more fingerprints including a $J^{th}$ fingerprint for a particular fixed-size signature or signature substring having a first basic unit in a scanning direction at a location within the particular fixed-size signature or signature substring that has a remainder equaling J when divided by a step size for a signature scanning operation such that the number of fingerprints is equal to the step size for signature scanning and the particular fixed-size signature or signature substring is identifiable at any location within any string fields to be scanned, where each fingerprint includes one or more fragments of a particular fixed-size signature or signature substring, the one or more fragments having particular locations anywhere within the particular fixed-size signature or signature substring, receiving a particular string field comprising a string of data values, identifying any signatures included in the particular string field including scanning the particular string field for the one or more fingerprints associated with the one or more signatures for each scan step size and searching the particular string field for the one or more follow-on search data structures at the locations where one or more fingerprints are found, and outputting any identified signatures in the particular string field. Other embodiments of this aspect include corresponding systems, apparatus, and computer program products.

Implementations can include one or more of the following features. Multiple fingerprints can be selected for each fixed-size signature or signature substring and the scanning can include scanning the particular string field for multiple fingerprints associated with the one or more signatures including two or more fingerprints in parallel for each scan step size. Each fingerprint of the one or more fingerprints of a particular signature can be fully specified either originally or after mapping them into one or more shadow spaces where the shadow spaces are spaces that correspond to a generalized format from the original space where the shadow spaces are spaces that introduce some ambiguity to the original space such that a single fingerprint in a particular shadow space corresponds to one or more fingerprints in the original space.

The method of string signature scanning can further include one or both of scanning the particular string field in an original space for one or more fingerprints for each scan step size and scanning the particular string field in each shadow space of the one or more shadow spaces for one or more fingerprints for each scan step size and then verifying the identified fingerprints in the original space at the scan location where one or more identified fingerprints are found in at least one of the one or more shadow spaces. Introducing some ambiguity to the original space can further include one or more of changing all the characters in both upper and lower cases in an original space to a same case, changing all numerical digits from 0 to 9 in an original space to a same digit, and changing all of both "space" and "-" in an original space to one of a "space" or "-".

Scanning for the one or more fingerprints associated with the one or more signatures can further include scanning using one or more of one or more hash tables and one or more bloom filters. Scanning for the one or more fingerprints associated with the one or more signatures can further include scanning using one or more of a hash value de-multiplexer and a fingerprint length de-multiplexer. A number of unique fingerprint lengths can be less than a number of unique signature lengths for multiple signatures and the scanning can further include scanning the particular string field for multiple fingerprints for the signatures including two or more fingerprints of a same length in parallel for each scan step size. The one or more fingerprints can be selected such that their lengths are limited to a length list that covers one or more lengths within one or more ranges of lengths providing multiple resolution fingerprint scanning. Each length of the lengths of the fingerprints can be a multiple of a step size for a signature scanning operation. The method of string signature scanning can further include scanning for the one or more fingerprints of the one or more signatures using one or more of one or more content addressable memories (CAM) and one or more finite automata (FA).

The method of string signature scanning can further include decomposing each fingerprint of multiple fingerprints for multiple signatures into one or more fingerprint segments such that a number of unique fingerprint segment lengths is less than a number of unique fingerprint lengths for the signatures, scanning the particular string field for the fingerprint segments including two or more fingerprint segments in parallel, and synthesizing identified fingerprint segments into any fingerprint matches. All fingerprint segments can have a same length and the scanning the particular string field for multiple fingerprint segments can use a step size for a signature scanning operation that is a multiple of the fingerprint segment length. A fingerprint segment bitmap specifying one or more possible locations within any fingerprints for a particular fingerprint segment can be stored with the particular fingerprint segment for synthesizing identified fingerprint segments into any fingerprint matches. Fingerprint length information specifying one or more possible fingerprint lengths can be stored with the first segment of each fingerprint or each segment of a fingerprint for synthesizing identified fingerprint segments into any fingerprint matches. One or more finite automata (FA) can be used for synthesizing identified fingerprint segments into any fingerprint matches.

The method of string signature scanning can further include storing a probability of a false positive for each fingerprint, examining the one or more probabilities of a false positive at the locations where one or more fingerprints are found, and searching the particular string field for the one or more follow-on search data structures when one of the one or more probabilities of a false positive is not sufficiently low. The method can further include constructing a differential search structure using one or more distinct basic units among multiple fixed-size signatures or signature substrings associated with a fingerprint and searching the particular string field for the one or more follow-on search data structures including searching for multiple fixed-size signatures or signature substrings associated with an identified fingerprint differentially. The method can further include encoding each of one or more fixed-size signatures or signature substrings with one or more mask bits including one or more mask bits for specifying one or more of a don't care, a case-sensitivity, a negation, a pre-defined range, a logic operation, and an arbitrary range, the one or more mask bits including one or more of one or more per basic unit or sub-basic unit mask bits, one or more segment mask bits, and one or more fixed-size signature or signature substring mask bits and searching the particular string field for the one or more follow-on search data structures including searching for the mask encoded fixed-size signatures or signature substrings. The method can further include normalizing the particular string field, including one or more of decompressing the particular string field if the particular string filed is in a compressed format, decoding the particular string field if the particular string field is encoded, and removing unnecessary string data.

In general, one aspect of the subject matter described in this specification can be embodied in methods for string signature scanning that include the actions of decomposing each signature of multiple signatures into one or more signature segments, receiving a particular string field comprising a string of data values, scanning the particular string field for the signature segments for the signatures including two or more signature segments in parallel; synthesizing identified signature segments into any signature matches when there is at least one signature match, and outputting any identified signatures in the particular string field. Other embodiments of this aspect include corresponding systems, apparatus, and computer program products.

Implementations can include one or more of the following features. Scanning for the signature segments can further include scanning using one or more of one or more hash tables and one or more bloom filters with or without one or more of a hash value de-multiplexer and a fingerprint length de-multiplexer. A signature segment bitmap specifying one or more possible locations within any signatures for a particular signature segment can be stored with the particular signature segment for synthesizing identified signature segments into any signature matches. Signature length information specifying one or more possible signature lengths can be further stored with the first segment of each signature or each segment of a signature for synthesizing identified signature segments into any signature matches. One or more finite automata (FA) can be used for synthesizing identified signature segments into any signature matches.

In general, one aspect of the subject matter described in this specification can be embodied in methods for string signature scanning that include the actions of processing one or more signatures into one or more formats including decomposing each variable-size signature of the one or more signatures into multiple fixed-size signature substrings and one or more variable-size signature substrings, receiving a particular string field including a string of data values, identifying any signatures included in the particular string field including scanning the particular string field for the fixed-size signatures or signature substrings and synthesizing identified fixed-size signature substrings into any variable-sized signatures at the location where one or more fixed-size signature substrings are identified, and outputting any identified signatures in the particular string field. Processing one or more signatures into one or more formats can further include storing location information of each fixed-size signature substring including an order and a distance range to the next fixed-size signature substrings with or without a description of a variable-size signature substring between each pair of consecutive fixed-size signature substrings into a static signature synthesis rule database, and synthesizing identified fixed-size signature substrings into any variable-sized signatures can further include checking the location information of each fixed-size signature substring with and without verifying the variable-size signature substring between each pair of consecutive fixed-size signature substrings and updating a dynamic signature synthesis state table. One or more finite automata (FA) can be used for synthesizing identified fixed-size signature substrings into any variable-sized signatures. Other embodiments of this aspect include corresponding systems, apparatus, and computer program products.

In general, one aspect of the subject matter described in this specification can be embodied in methods for string signature scanning that include the actions of selecting multiple fixed-size signatures for each of one or more string objects, the fixed-size signatures for a particular string object including a $J^{th}$ fixed-size signature having a first basic unit in a scanning direction at a location within the particular string object that has a remainder equaling J when divided by a step size for a signature scanning operation such that a number of fixed-size signatures for the particular string object is equal to the step size for a signature scanning operation and the particular string object is identifiable at any location within any string fields to be scanned, receiving a particular string field comprising a string of data values, identifying any string objects included the particular string field including scanning the particular string field for the fixed-size signatures associated with the one or more string objects including two or more fixed-size signatures in parallel for each scan step size, and outputting any identified string objects in the particular string field. The method can further include selecting multiple variable-size signatures based on multiple non-overlapping, ordered sets of the fixed-size signatures for each of the one or more string objects, where each of the variable-size signatures includes a fixed-size signature from each set of fixed-size signatures and a variable-size string linked each pair of consecutive fixed-size signatures such that the number of signatures for each string object is equal to $S^n$, where S is the scan step size or the number of fixed-size signatures in each of the sets and n is the number of the sets, and identifying any string objects included the particular string field including scanning the particular string field for the fixed-size signature substrings of the variable-size signatures associated with the one or more string objects for each scan step size and synthesizing identified fixed-size signature substrings into any variable-size signatures at the locations where one or more fixed-size signature substrings are found. Other embodiments of this aspect include corresponding systems, apparatus, and computer program products.

In general, one aspect of the subject matter described in this specification can be embodied in methods for string signature scanning that include the actions of selecting one or more fixed-size signatures for each of one or more string objects, processing the one or more fixed-size signatures for the one or more string objects into one or more formats that include one or more fingerprints and one or more follow-on search data structures for each fixed-size signature, the fingerprints for a particular string object including a $J^{th}$ fingerprint having a first basic unit in a scanning direction at a location within the particular string object that has a remainder equaling J when divided by a step size for a signature scanning operation such that the number of fingerprints for the particular string object is equal to the step size for a signature scanning operation and the particular string object is identifiable at any location within any string fields to be scanned, where each fingerprint includes one or more fragments of a particular fixed-size signature of the one or more fixed-size signatures for the particular string object, the one or more fragments having particular locations anywhere within the particular fixed-size signature, receiving a particular string field comprising a string of data values, identifying any string objects included the particular string field including scanning the particular string field for the fingerprints associated with the one or more string objects including two or more fingerprints in parallel for each scan step size and searching the particular string field for the follow-on search data structures at the locations where one or more fingerprints are found, and outputting any identified string objects in the particular string field. The method can further include selecting multiple variable-size signatures based multiple non-overlapping, ordered sets of the one or more fixed-size signatures for each of the one or more string objects, where each of the variable-size signatures includes a fixed-size signature from each set of fixed-size signatures and a variable-size string linked each pair of consecutive fixed-size signatures such that the number of variable-size signatures for each string object is equal to the product of the sizes of the sets of fixed-size signatures, and identifying any string objects included in the particular string field including scanning the particular string field for the fingerprints associated with the one or more string objects including two or more fingerprints in parallel for each scan step size and searching the particular string field for the follow-on search data structures at the locations where one or more fingerprints are found. Other embodiments of this aspect include corresponding systems, apparatus, and computer program products.

In general, one aspect of the subject matter described in this specification can be embodied in systems for signature scanning. The system includes a machine-readable storage device including a computer program product, and one or more processors operable to execute the computer program product, and perform operations including providing one or more modules including a signature pre-processing module operable to process one or more signatures into one or more formats that include one or more fingerprints and one or more follow-on search data structures for each fixed-size signature or each fixed-size signature substring of a variable-size signature, the one or more fingerprints including a $J^{th}$ fingerprint for a particular fixed-size signature or signature substring having a first basic unit in a scanning direction at a location within the particular fixed-size signature or signature substring that has a remainder equaling J when divided by a step size for a signature scanning operation such that the number of fingerprints is equal to the step size for signature scanning and the particular fixed-size signature or signature substring is identifiable at any location within any string fields to be scanned, where each fingerprint includes one or more fragments of a particular fixed-size signature or signature substring, the one or more fragments having particular locations anywhere within the particular fixed-size signature or signature substring, a scan pre-processing engine operable to process an input string field comprising a string of data values into one or more formats for a signature scan, and a fingerprint scan engine operable to identify one or more fingerprints associated with one or more signatures on the input string field, the identifying including scanning the input string field for the one or more fingerprints associated with the one or more signatures for each scan step size. The system can further include a fixed-size signature search engine operable to identify fixed-size signatures or fixed-size substrings of variable-size signatures for the identified fingerprints. The system can further include a variable-size signature search engine operable to identify variable-size signatures including synthesizing identified fixed-size substrings of variable-size signatures into any variable-size signatures. Other embodiments of this aspect include corresponding systems, apparatus, and computer program products.

Implementations can include one or more of the following features. The signature pre-processing module can select one or more shadow spaces and translate one or more fingerprints into the one or more shadow spaces for scanning. The signature pre-processing module can decompose each of one or more fingerprints into one or more fingerprint segments of one or more lengths and store synthesis information for each fingerprint segment in a fingerprint database and the fingerprint scan engine can identify fingerprints associated with one or more signatures on the input string field, the identifying including scanning the input string field for multiple fingerprint segments for each scan step size and synthesizing identified fingerprint segments into any fingerprint matches at the locations where one or more identified fingerprint segments were identified. The signature pre-processing module can encode one or more fragments of a signature with one or more mask bits and store the one or more mask bits with the one or more fragments of the signature. The signature pre-processing module can construct a differential search structure using one or more distinct basic units among multiple signatures. The signature pre-processing module can construct a signature database, including a fingerprint database, a fixed-size signature database, and a variable-size signature database when there is at least one variable-size signature in the signature scanning system.

The scan pre-processing engine can further include a scan feeder, a shadow translator, a string memory, and a shadow memory. The scan pre-processing engine can process a string field in one or more blocks, the processing including one or more of feeding, decoding, normalizing, and translating, each block of the one or more blocks including a fingerprint scan region for performing a fingerprint scan as well as a signature search, a front signature search region in advance of the fingerprint scan region for performing a signature search, and a rear signature search region behind the fingerprint scan region for performing a signature search. Each region of the three regions of a block can be placed into one or more memory banks of a same size, all the memory banks for all the three regions with or without one or more additional banks forming a ring that starts at the first bank of the current front signature search region for minimizing data movement in memory.

The fingerprint scan engine can detect one or more fingerprints using one or more of one or more hash tables and one or more bloom filters. The fingerprint scan engine can further include a fingerprint scan controller, a fingerprint hash engine, a fingerprint search engine, a fingerprint synthesis engine, and a fingerprint database. The fingerprint hash engine can compute multiple hash values for multiple hash keys sequentially in non-overlapping prefix segments using a sequential hash function. The fingerprint scan engine can include a fingerprint synthesis engine that can synthesize multiple fingerprint segments into any fingerprint matches using one or more of a fingerprint segment bitmap and fingerprint length information either in parallel or sequentially. The fingerprint scan engine can include a fingerprint synthesis engine that further includes one or more finite automata (FA).

One or more fingerprints of one or more lengths can be decomposed into multiple segments of a same size and scanned by one or more fingerprint scan engines that have a same scan step size, each of the one or more fingerprint scan engines either covering one or more non-overlapping, interleaving locations in the input string field such that the resultant scan step size of the one or more fingerprint scan engines is the product of the number of the one or more fingerprint scan engines and the original scan step size of a single fingerprint scan engine or covering one or more partially overlapping, interleaving locations in the input string field such that the resultant scan step size of the one or more fingerprint scan engines is between the original scan step size of a single fingerprint scan engine and the product of the number of the one or more fingerprint scan engines and the original scan step size of a single fingerprint scan engine. The number of fingerprint scan engines having a smaller product of a scan step size and a memory speed are more than the number of fingerprint scan engines having a larger product of a scan step size and a memory speed. One or more memories used for one or more fingerprint scan engines covering a shorter fingerprint segment can have the same speed as or be faster than one or more memories used for one or more fingerprint scan engines covering a longer fingerprint segment and one or more memories used for one or more fixed-size signature search engines covering one or more fingerprints that are shorter in average can have the same speed as or be faster than one or more memories used for one or more fixed-size signature search engines covering one or more fingerprints that are longer in average. The one or more fastest memories in the scanning system can be used for the one or more fingerprint scan engines covering one or more fingerprints shorter than a particular length with or without first portions of the corresponding fixed-size signature search engines. Multiple fingerprint scan engines for a same set of one or more fingerprints can share a same multi-port memory. The fingerprint scan engine can further include one or more content addressable memories (CAM).

The fixed-size signature search engine can further include a signature finder, a signature verifier, and a fixed-size signature database. The signature finder and the signature verifier can compare one or more masked fragments of a signature using a signature unit comparator and a signature segment comparator to identify one or more fixed-size signatures. The signature finder can search for one or more signatures or signature substrings differentially. The variable-size signature search engine can further include a signature rule lookup engine, a signature state verifier, a signature rule database, and a signature state table. The variable-size signature search engine can include a finite automaton (FA). One or more engines can include one or more of one or more content addressable memories (CAM) and one or more finite automata (FA).

Particular embodiments of the subject matter described in this specification can be implemented to realize one or more of the following advantages. A string scanning system for scanning signatures in a signature database is provided. The string scanning system is flexible and can be easily updated. A string signature scanning engine can provide ultra-high throughput (e.g., 100 Gbps) even for a large number of signature (e.g., hundreds of thousands), complex signatures (e.g., up to thousands of bytes long, supporting wildcard "*" and "?", range, case-sensitive, negation), and a dynamic signature database. The string scanning system is scalable in both scan speed and signature database size and complexity. Additionally, the string scanning system can require less memory bandwidth and memory storage. The string scanning system can be implemented in both software and an FPGA (field programmable gate array) or an ASIC (application-specific integrated circuit). Furthermore, the string scanning system can be cost effective and suitable for use in both low-cost and high-end systems.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Overview

Methods and systems for performing string signature scan on a string field against a string signature database are provided. In one implementation, a "divide and conquer" approach is used to scan for string signatures in multiple pipelining stages. Each variable-size signature is decomposed into multiple fixed-size signature substrings for scanning, while each fixed-size signature or each fixed-size signature substring of each variable-size signature is further decomposed into multiple fragments for scanning. In one implementation, a "coarse scanning followed by fine examining" approach is used to scan for string signatures in multiple pipelining stages. One or more fingerprints are first scanned for each fixed-size signatures or each fixed-size signature substrings of each variable-size signature at each scan location. Further examinations are only required at locations where one or more fingerprints are found. Moreover, the fingerprints can be first scanned for their "shadows" at each scan location (shadows and associated shadow spaces are described in greater detail below). A full examination of the fingerprints is only required at locations where one or more fingerprint shadows are found.

The fingerprint shadows can further be first scanned in segments at each scan location and then synthesized by only checking their possible positions within any signatures and their possible lengths. A full examination of the fingerprint shadows is only required at locations where one or more synthesized fingerprint shadows are found. Furthermore, the segments of the fingerprint shadows can be first scanned for their hash values at each scan location. A further examination of the segments of fingerprint shadows is only required at locations where one or more of the hash values are found. In one implementation, scanning in multiple pipelined stages is supported by pre-processing the string signatures associated with the string field and storing the pre-processed string signatures in a signature database prior to scanning.

Figure 1A:
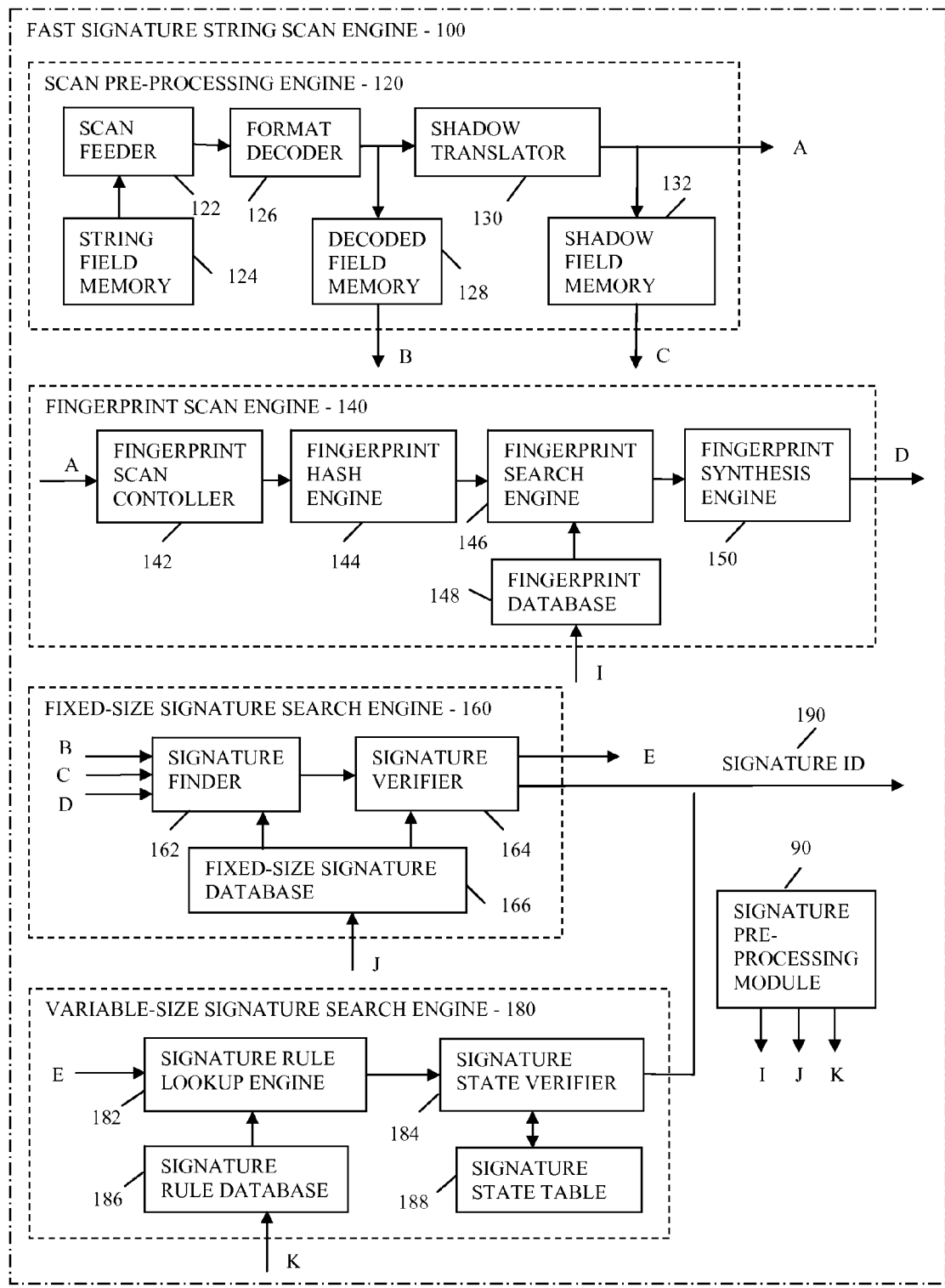
FIG. 1A illustrates a block diagram of an example fast string signature scan system.

FIG. 1A illustrates a block diagram of an example fast string signature scan system. The fast string signature scan system includes a signature string scan engine 100. The signature string scan engine 100 includes a signature pre-processing module 90, a scan pre-processing engine 120, a fingerprint scan engine 140, a fixed size signature search engine 160, and a variable-size signature search engine 180. The string signature scan engine 100 can scan string fields against one or more string signature databases and may return a matched signature ID 190 and the location of the matched signature within the string fields, identifying a particular signature. In one implementation, the signature database includes a fingerprint database 148, a fixed-size signature database 166, and a signature rule database 186.

Figure 1B:
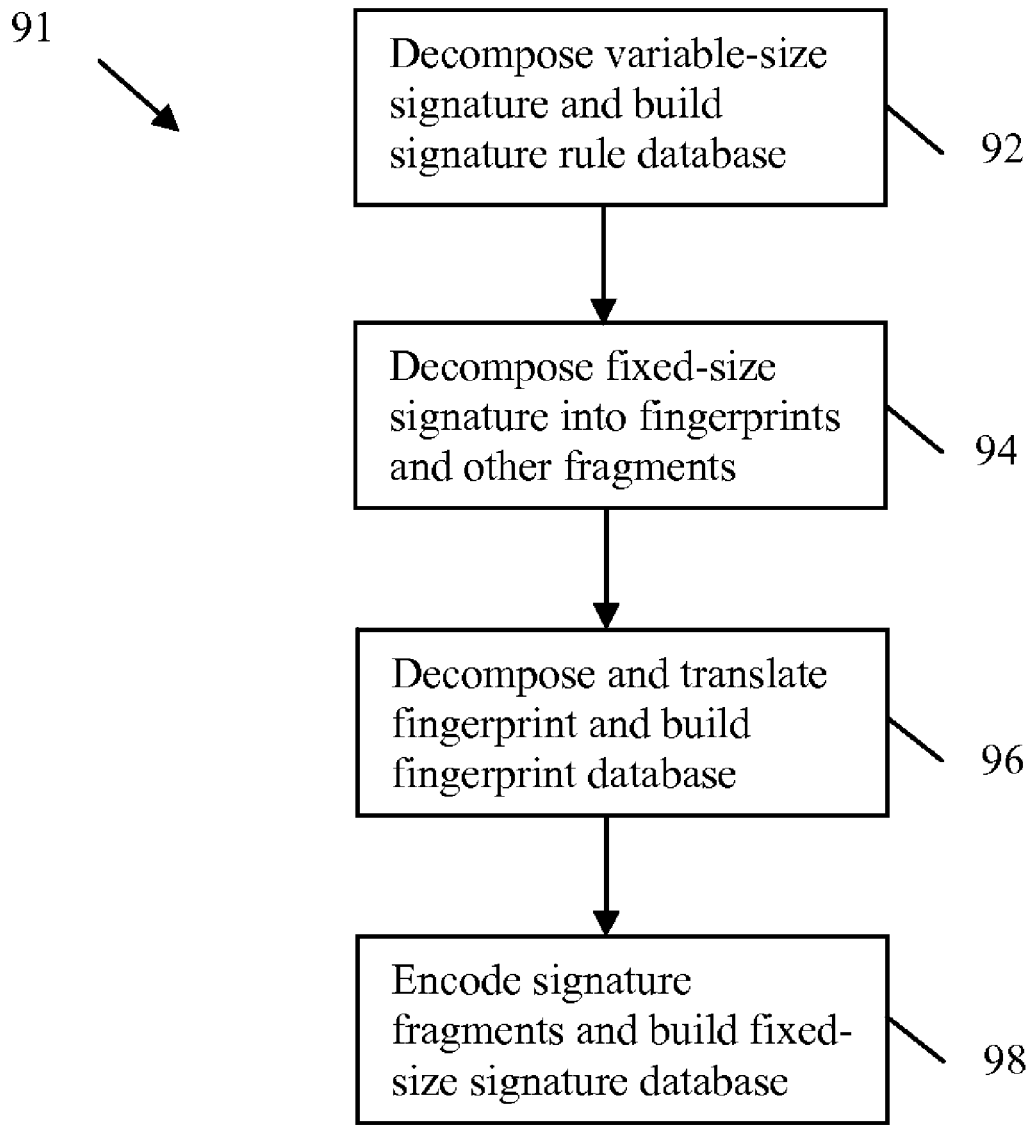
FIG. 1B shows an example process for building a string signature database.

FIG. 1B shows an example process 91 for pre-processing each string signature. In one implementation, a variable-size string signature can be decomposed into multiple fixed-size substrings using one or more variable-size substrings and stored with information describing a relationship among the fixed-size substrings in the signature rule database 186 (step 92).

A fixed-size string signature or signature substring from step 92 can then be decomposed into multiple fragments that can be tested in an optimal order for fast scanning (step 94). In one implementation, the first one or more fragments of a string signature can be particularly significant and function as a fingerprint for a fixed-size string signature or substring. The fingerprint of a string signature can be scanned quickly, but also minimizes a probability of a false negative or false positive result. In one implementation, the probability of a false negative is zero. In one implementation, the number of unique fingerprint lengths can be less than the number of unique signature lengths for multiple signatures so that the scanning speed for methods that required an independent scanning for patterns of each unique length increases accordingly. When the scan step size is more than one basic unit, in one implementation, multiple fingerprints can be used for a single string signature, in which such that the first basic unit of each fingerprint in a scanning direction can be shifted by one or more basic units relative to each previous fingerprint. The scanning direction is the moving direction of locations for a scanning operation within an input string field.

The fingerprint of a string signature or signature substring can be further decomposed into fingerprint segments, translated into one or more shadow spaces as needed, and then inserted into the fingerprint database 148 and thus the signature database (step 96). Because fingerprints of different lengths can be scanned independently, a fingerprint can be further broken up into multiple segments that can first be scanned either sequentially or in parallel. In some implementations, the fingerprint is broken up into multiple segments such that the number of unique fingerprint segment lengths, if not one, can be significantly less than the number of unique fingerprint lengths such that the scanning speed for scanning methods that required an independent scanning for patterns of each unique length increases accordingly. The fingerprint segment scanning results can then be synthesized together for detecting the fingerprint.

In order to further gain the scan efficiency and scan capability for complex signatures, in one implementation, the fingerprint as well as other fragments of a string signature can first be translated into and scanned in one or more shadow spaces and then verified in the original space. The shadow spaces can be selected for being able to simplify and accelerate the scan process, while also being operable to cover all the possible forms of the fingerprints or fingerprint segments. A shadow space can cover multiple forms of the fingerprints or segments. For example, to support per character case-insensitive and case-sensitive, a shadow space can be either a lowercase only or uppercase only space. For a special case, a shadow space can be the original space.

Fully specified fingerprints or any other signature substrings are still fully specified in any shadow spaces. Hence, fully specified fingerprints can always be scanned in any shadow spaces, in addition to the original space. In one implementation, in order to reduce the number of spaces to be scanned, all fully specified fingerprints are scanned in one of one or more shadow spaces so that no fingerprint scanning is required in the original space. In another implementation, only one shadow space is selected for a signature database and all fingerprints in the signature database are scanned in the single shadow space.

In one implementation, the fingerprint database includes one or more bloom filters or hash tables. In another implementation, the fingerprint database includes one or more enhanced bloom filters or hash tables, where one or both of additional bits of hash value and a fingerprint length are stored in the data structure for hash value multiplexing as well as fingerprint length multiplexing to further reduce the false positive and the number of collisions when the original hash key is too large or too costly to be compared during fingerprint scanning.

Finally, all the fragments of a fixed-size string signature or substring of a variable-size string signature can be encoded and stored into fixed-size signature database 166 for searching for the fixed-size string signatures or signature substrings (step 98). In one implementation, the fragments can be encoded with per basic unit or sub-basic unit masks for string signatures matching particular criteria (e.g., "don't care", "equal", "unequal", "case-insensitive", "case-sensitive", "in a range", "out of a range"). In one implementation, the masked fragments can then be compiled into a linked list or any other search structures (e.g., trees). In another implementation, per fragment masks or per fixed-size signature or signature substring masks can also be compiled into the search structures for saving storage space. In another implementation, a group of string signatures can be further encoded differentially to form a differential data structure (e.g., differential trees), where signatures are encoded using their different basic units among the string signatures.

Figure 1C:
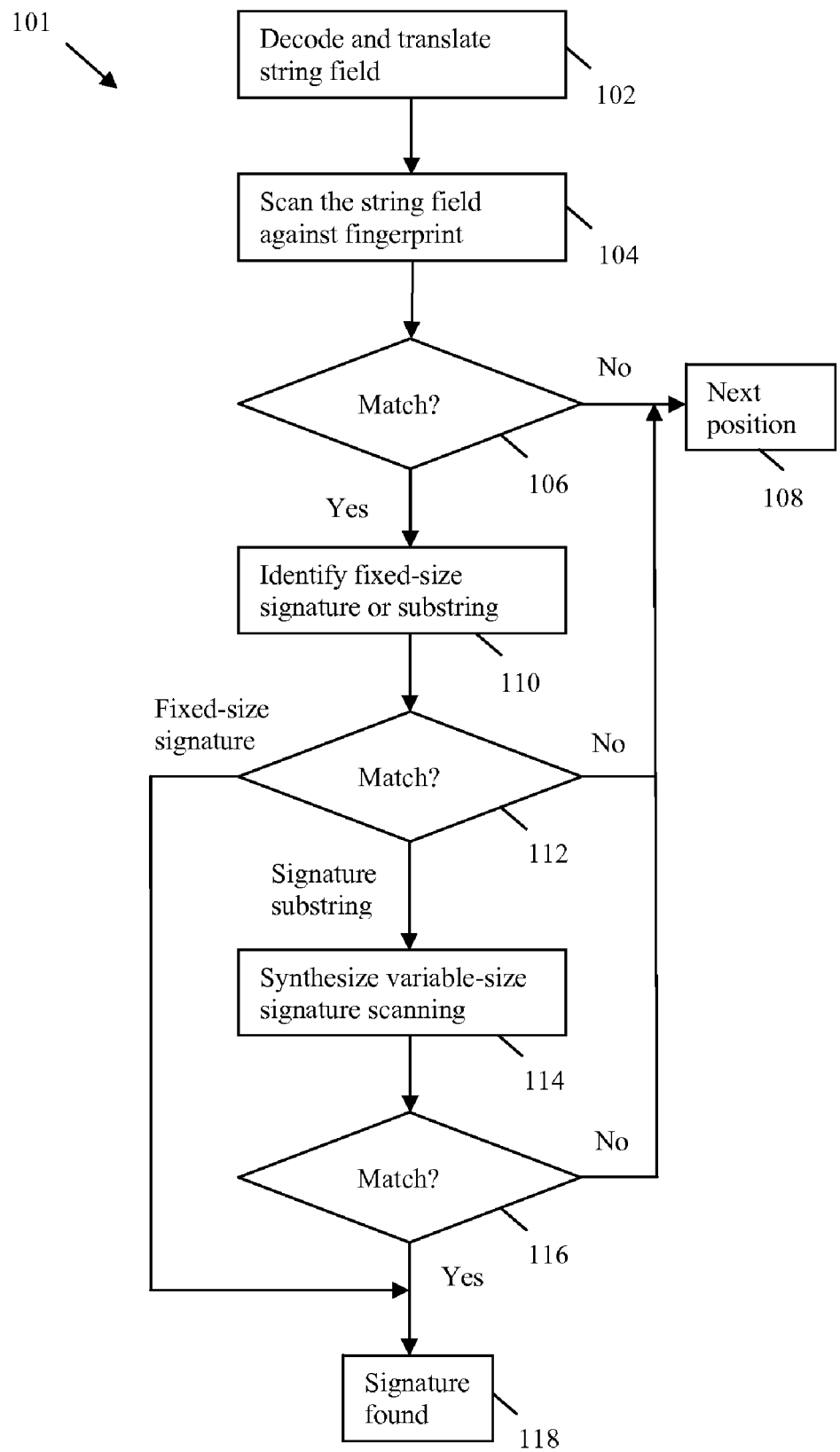
FIG. 1C shows an example process for string signature scanning.

FIG. 1C shows an example process 101 for scanning string signatures. A string field to be scanned is first decoded and translated (e.g., using scan pre-processing engine 120) into one or more formats for subsequent scan stages (step 102). The string field is scanned (e.g., using the fingerprint scan engine 140) in the shadow space by first comparing a shadow of the string field against one or more shadows of the fingerprints of string signatures and then verifying any identified fingerprint shadows in the original fingerprint space (step 104). A check is made to see if there is a fingerprint match (step 106).

After scanning a no match condition or a matching condition results in either an output indicating that no string signatures match a particular fingerprint, or that a small number of signatures match. In one implementation, the fingerprint scan engine 140 provides output results with zero false negatives and an allowable probability of false positives. If there are zero matches, the scanning process is complete at the current scan position and can move into a next scan position (step 108). If a positive match is detected in the fingerprint scanning, further searches for (e.g., by a fixed-size signature search engine 160) the small number of matched signatures are performed to more specifically identify either a fixed-size signature or a fixed-size signature substring of a variable-size signature (step 110).

A check is made to see if there is a fixed-size string signature or substring match (step 112). If there are zero matches, the scanning process is complete at the current scan position and the process can move to the next scan position (step 108). If the matches are one or more fixed-size signatures, a fixed-size signature ID for each match is output and the scan is completed (step 118). If the fixed-size signature substring is instead identified as part of one or more variable-size signatures, the fixed-size signatures can then be dynamically synthesized (e.g., by a variable-size signature search engine 180) to detect one or more variable-size signature IDs (step 114). A check is made to see if there is a variable-size string signature match (step 116). If there are zero matches, the scanning process is complete at the current scan position and ready to move into the next scan position (step 108). If the match is one or more variable-size signatures, a variable-size signature ID for each match is output and the scan is completed (step 118).

In one implementation, a probability of a false positive is stored in the fingerprint database 148 for each fingerprint during the pre-processing process 91. When there is a fingerprint match in step 106, the probability of a false positive associated with the matched fingerprint is examined. If the probability of a false positive is sufficiently low (e.g., below a specified threshold), the scanning process is complete at the current scan position and can move into a next scan position (step 108). In another implementation, each of all the fingerprints in fingerprint database 148 has a sufficiently low probability of a false positive result so that storing and examining the probabilities of a false positive is not needed. The scanning process is complete at the current scan position after the fingerprint scanning and can move into a next scan position (step 108).

During step 102, the scan pre-processing engine 120 first decodes, normalizes, and translates the string field into the same format(s) as signatures in the string signature database. In one implementation, the string signature scanning is performed on the entire string field. However in other implementations, buffering the entire string field can be impossible because of limitations in memory space and low latency requirements of some systems. Therefore, during step 102, the string field can be broken into a number of predefined blocks. The string signature scanning is then performed on each predefined block of data.

After loading a block of string field for the string signature scanning, the block of data can then be decoded and normalized to different formats for later scanning. In one implementation, the decoding and normalizing process can accommodate different compression formats (e.g., LZS, PKZip, and gzip) and different encoding formats (e.g., UU encoding, MIME encoding, HTML, and XML) and remove random, "anti-scan" junk data.

In one implementation, the decoded string fields are further translated into one or more fingerprint shadow spaces as in the string signature database, to support complex string signatures. For example, the decoded string fields are translated into all-lowercase (e.g., a shadow space) to support case-insensitive string signature scanning. The string signature scanning can then be performed on the all-lowercase decoded string fields and then verified using both case specific decoded string fields and all-lowercase decoded string fields.

During step 104, fingerprint scanning can be first performed to identify fingerprints of signatures whose shadows in the shadow spaces are fully specified strings. In one implementation, to scan a large and complex string signature database quickly, the fingerprint scan engine 140 can scan multiple basic units based on either one or more hash tables or bloom filters.

In one implementation, hash value multiplexing as well as fingerprint length multiplexing can be used by the fingerprint scan engine 140, to use the memory storage more efficiently and reduce the false positive results and probability of fingerprint collision (i.e., more than one fingerprint matching a particular signature). The use of hash value multiplexing and fingerprint length multiplexing can further minimize the number of false positive results (i.e., erroneous signature matches in the string field), while ensuring zero false negative results (i.e., failing to match a signature in the string field).

During step 110, fixed-size signature scanning is performed. The fixed-size string signatures and the fixed-size substring of variable-size string signatures can be identified during the fixed-size signature scanning stage. Fixed-size signature scanning is performed only when at least one fingerprint is found during fingerprint scanning. The fixed-size string signatures and the substring of the variable-size string signatures that are associated with matched fingerprints can be searched linearly or based on other search structures (e.g., trees) in the decoded format. In one implementation, masked comparisons can be supported per basic unit or sub-basic unit for string signatures matching particular criteria, (e.g., "don't care", "equal", "unequal", "case-insensitive", "case-sensitive", "in a range", "out of a range").

During step 114, variable-size signature scanning is performed. In one implementation, variable-size signature scanning is required only for variable-size string signatures or string signatures including one or more variable-size symbols or substrings. The fixed-size signature substrings of a variable-size signature can be identified during fixed-size signature scanning and the results can then be dynamically concatenated to synthesize one or more original variable-size signatures during the variable-size signature scanning step. The synthesis can be performed using a static synthesis rule table and a dynamic synthesis state table. The synthesis rule table defines the rules for synthesizing a variable-size string signature, while the synthesis state table maintains the current state of synthesizing against the synthesis rules.

Signature Database Pre-Processing

In one implementation, string signatures are processed by the signature pre-processing module 90 before the string field is scanned against them to gain scanning speed and memory efficient. The signature pre-processing module 90 can decompose, translate, and encode the signatures into one or more formats prior to storage in the signature database. In one implementation, the signature pre-processing module 90 can build and maintain a fingerprint database 148, a fixed-size signature database 166, and a signature rule database 186.

When one or more string signatures in the signature database include one or more variable-size substrings (e.g., a "*" for zero or more arbitrary basic units or a "(bc) {3-6}" for repeating "bc" for 3 to 6 times), each of these variable-size string signatures can be first decomposed into multiple fixed-size substrings using the variable-size substrings. For example, if a string signature is substring1*substring2*substring3, where substring 1, substring2, and substring3 are fixed-size strings without a variable-size symbol, the string signature is broken into substring1, substring2, and substring3. Each of the "*" in substring1*substring2*substring3 can be replaced by a variable-size substring. In one implementation, each of the fixed-size substrings is first scanned independently and then synthesized back into the original variable-size signature.

In one implementation, signature rule database 186 can be constructed for the fixed-size substring synthesis using location information of each fixed-size substring (e.g., order, last substring flag, distance or distance range to next fixed-size substring). In one implementation, when the variable-size substring between two consecutive fixed-size substrings is other than "don't care", the synthesis rule database 186 can further include a description of the variable-size substring for the fixed-size substring synthesis. In another implementation, one or more finite automata (FA) can be constructed using the fixed-size signature substrings and the variable-size signature substrings for the fixed-size signature substring synthesis, where each of the fixed-size signature substrings is used as a whole as an input symbol.

In one implementation, a fixed-size string signature or signature substring is further decomposed into multiple fragments (the fragments including the fingerprint of the signature or signature substring) that can be tested in an optimal order. The multiple fragments can be of different sizes or same sizes. To prevent false negatives or to provide a zero miss rate against all the signatures, the union of all the fragments is equal to the original string signature. During the signature scanning, the false positive decreases (i.e., the confidence level of matching increases), as the number of positive fragments increases. The testing process can terminate after either a first negative fragment or a last positive fragment. In one implementation, the fragments can be selected for either terminating the scanning without a signature matching as early as possible or identifying a signature matching with a false positive rate that decreases to zero.

In one implementation, the fingerprint includes multiple fragments. In another implementation, the fingerprint includes only one fragment that is encoded in the form of a 3-tuple including {fragment, length, offset}, where a fragment is the first fragment or fingerprint of the string signature, a length is a length of the fingerprint, and an offset is the offset of the fingerprint within a fixed-size signature or signature substring. A particular fingerprint is a particular substring of a fixed-size string signature or a fixed-size substring of a variable-size string signature.

In one implementation, the shadow space can be selected for being able to simplify and accelerate the signature scan process, while also being operable to cover multiple forms of the fingerprints or fragments of signatures. Ideally, the shadow value can be directly used as a hash key. For example, to support per character case-insensitive and case-sensitive, the shadow space can be either a lowercase only or uppercase only space. For example, to scan driver license numbers comprising one alphabetic character followed by seven numerical characters in which each character can be further specified as an arbitrary range within the alphabetic or numerical character, the shadow space can be a codeword or any one of alphabetic characters (e.g., "a") for all the alphabetic characters and another codeword or any one of numerical characters (e.g., "0") for all the numerical characters. For example, to scan social security numbers (SSN) comprising three groups of three numerical characters separated by either "space" or "-" in which each numerical character can be further specified as an arbitrary range within numerical character, the shadow space can be a codeword or any one of numerical characters (e.g., "0") for all the numerical characters and another codeword or either "space" or "-" for both "space" and "-". For a special case, the shadow space can be the original space.

In one implementation, after being scanned in their shadow spaces, the verification of the fingerprints in the original space can be performed immediately after detecting the shadows. In another implementation, the verification can be performed after testing some or all other fragments of the signature. No verification is needed if the fingerprints completely overlap with other fragments of the signature.

The fingerprint can be selected to speed up the fingerprint scanning, while providing a minimal probability of a false positive result after the fingerprint scanning. In one implementation, the fingerprints can be of arbitrary size and at any location within the string signatures. In another implementation, the fingerprints can be of limited sizes or at limited locations within the string signature to meet system requirements. For example, the fingerprints can be only at locations having offsets less than a specific value according to a latency requirement of a system.

In one implementation, fingerprints can be selected using one or more of the following criteria:

1) there is no wildcard or range in the shadow of the fingerprint for quicker scanning, 2) the fingerprint is unlikely to occur in the string field to be scanned, 3) the number of fingerprints shared by more than one signature is as small as possible, and 4) the number of fingerprints shared a same fingerprint segment is as small as possible.

Additional criteria can be added according to the system requirements. Typically, most string signatures, if not all the string signatures, in conventional network applications and non-network applications include at least one reasonable size substring without a wildcard or range after translating into a selected shadow space. In one implementation, criteria no. 1 is a requirement. In another implementation, as a requirement, criteria no. 1 further constrains to all fingerprints that each of them is fully specified at least in one of shadow spaces. The string signatures that do not contain such a substring can either be expanded into multiple signatures containing such a substring or scanned without expansion using a different scanning approach.

The fingerprints can be determined by examining all the possible substrings of a string signature that meet the requirements of criteria no. 1. Additional parameters for the fingerprints can also be considered in selecting fingerprints. By identifying fingerprints that are unlikely to occur in the string field to be scanned, according to criteria no. 2, the number of false positives can be reduced because it is unlikely that multiple signatures will include the same fingerprint. Additionally, by selecting fingerprints such that few signatures share the same fingerprint or the same key fingerprint segment, the number of initial matches that turn out to be false can be further reduced. The length of the fingerprints can be e.g., between 8 and 32 basic units, although the fingerprints can be shorter than 8 basic units or longer than 32 basic units.

Because the signatures can be very long (e.g., hundreds or thousands basic units in length), there can also be a large number of fingerprint lengths. However, in one implementation, the fingerprints of different lengths are scanned separately, resulting in slower scanning performance. In one implementation, to reduce the complexity of the scanning, the number of fingerprint lengths can be limited, e.g., less than 16, according to particular system requirements and system architectures. In one implementation, the lengths of fingerprints can be selected from a predefined length list. Furthermore, the lengths of the fingerprints can be selected to be exponential (e.g., 2, 4, 8, 16, 32). The fingerprint lengths can also be selected linearly (e.g., multiples of 4: 4, 8, 12, 16, 20, 24, 28, 32), or based on another method (e.g., 2, 3, 5, 8, 13, 21, 34), in accordance with the system requirements and system architecture.

In one implementation, the fingerprint of a signature can be selected using an algorithm. For example, the following algorithm can be used to find the fingerprint of a fixed-size signature or signature substring: (assuming the scan step size is equal to one, the lengths of fingerprints are fixed and given as $l_0, l_1, l_2, \ldots, l_{m-1}, l_m$ from the shortest to the longest, the fingerprint scan is performed in segments, and the shadow space for the fingerprint scan is given).

1. All the substrings of the signatures that are fully specified, after being translated into the shadow space, are identified.

2. for each of the substrings that are longer than $l_m$, identify all of substrings having a size $l_m$.

3. for each of the substrings of length $l_m$, identify the number of other fingerprints colliding with the substring, $N_c$, and the number of other fingerprints sharing the first fingerprint segment with it, $N_s$, and find the cost value using a cost function of the $l_m$, $N_c$ and $N_s$.

4. Steps 2 and 3 are repeated for substrings having a size $l_{m-1}, \ldots, l_2, l_1,$ and $l_0$.

5. Identify a fingerprint based on the smallest cost value from steps 2 to 4.

The above steps depend on the processing order of signatures. Several random orders can be applied to identify different fingerprints as necessary. In one implementation, the cost value can be obtained concatenating (m−i), $N_c$, and $N_s$, from the most significant bit to the least significant bit, where i=0, 1, 2, . . . , m and the i is a fingerprint size index. In one implementation, if a fingerprint having a particular size is found, no further selecting process is required on all the smaller sizes.

In another implementation, the fingerprint scan engine 140 moves a scan step size each time. At each scan location, the fingerprint scan engine 140 can scan for fingerprints of different sizes either sequentially or in parallel. As a result, the scanning speed linearly depends on the scan step size (i.e., the number of basic units between two consecutive scan locations). In one implementation, to increase scanning speed, the fingerprint scanning can be performed on multiple basic units rather than a signal basic unit. In order to ensure zero false negatives, multiple fingerprints can be used for each string signature and the number of the fingerprints can equal the scan step size. In other words, a fixed-size string signature or signature substring can be inserted into the signature database using multiple fingerprints and the number of the fingerprints can be equal to the scan step size. A $J^{th}$ fingerprint of a particular signature has a first basic unit in a scan direction at the location of (J+k*S) within the particular signature for J=0, 1, 2, . . . , S−1 and a non-negative integer k, where S is the scan step size. The signature can then be found at any location within the string field to be scanned. For example, if a particular string signature is "[Rr][Ee][Aa][Dd][Mm][Ee]123.exe", the scan step size is 4, and the fingerprint lengths include 4, 8, and 12, the following four fingerprints can be selected: "[Rr][Ee] [Aa] [Dd][Mm][Ee]123.ex", "[Ee][Aa][Dd][Mm][Ee]123.exe", "[Aa][Dd][Mm][Ee]123.", and "[Dd][Mm][Ee]123.e", where the [Rr], [Ee], [Aa], [Dd], and [Mm] are case-insensitive r, e, a, d, and m, respectively. Using the four fingerprints, "[Rr][Ee][Aa][Dd][Mm][Ee]123.exe" is inserted into the signature database four times. When the scan step size is one, only one fingerprint and thus one insertion is required.

The multiple fingerprints scanning can start at any location of the first S unit locations (e.g., any location within a scan step from the first unit) of an input string field. For example, in one implementation, the scanning starts at the $0^{th}$ location and will scan $(k*S)^{th}$ locations for a non-negative integer k.

Within any input string field, the $(k*S)^{th}$ locations will be covered by the $0^{th}$ fingerprint, the $(k*S+1)^{th}$ locations will be covered by the $(S-1)^{th}$ fingerprint, the $(k*S+2)^{th}$ locations will be covered by the $(S-2)^{th}$ fingerprint, . . . , and the $(k*S+S-1)^{th}$ locations will be covered by the $1^{st}$ fingerprint, for a non-negative integer k. In another implementation, the scanning starts at the $(S-1)^{th}$ location and will scan $(k*S+S-1)^{th}$ locations for a non-negative integer k. Within any input string field, the $(k*S)^{th}$ locations will be covered by the $(S-1)^{th}$ fingerprint, the $(k*S+1)^{th}$ locations will be covered by the $(S-2)^{th}$ fingerprint, the $(k*S+2)^{th}$ locations will be covered by the $(S-3)^{th}$ fingerprint, . . . , the $(k*S+S-2)^{th}$ locations will be covered by the $1^{st}$ fingerprint, and the $(k*S+S-1)^{th}$ locations will be covered by the $0^{th}$ fingerprint, for a non-negative integer k.

To increase the scan step size to S basic units, in one implementation, a modification of the above fingerprint selection algorithm for a single fingerprint for each fixed-size signature or signature substring when the scan step size is equal to 1 basic unit can be used for finding the S fingerprints for each fixed-size signature or signature substring as follows: the steps 1 to 4 are exactly the same as before, while the step 5 is modified to identify a $J^{th}$ fingerprint of the S fingerprints based on the smallest cost value for all substrings from step 2 that have a first basic unit in a scanning direction at an offset of $(J+k*S)$ within the fixed-size signature or signature substring for $J=0, 1, 2, \ldots, S-1$ and a non-negative integer k.

Typically there is only one signature for each string object, so that S fingerprints are required for each fixed-size signature or substring of a variable-size signature to support a scan step size of S basic units. In one implementation, to support a scan step size of S basic units, S fixed-size signatures can be selected for each string object such that a $J^{th}$ fixed-size signature of the S fixed-size signatures has a first basic unit in a scanning direction at an offset of $(J+k*S)$ within the string object for $J=0, 1, 2, \ldots, S-1$ and a non-negative integer k. The particular string object is then identifiable at any location within any string fields to be scanned. In one implementation, the S fixed-size signatures can be scanned without using a fingerprint. In another implementation, a fingerprint can further be selected for each of the S fixed-size signatures for the signature scanning.

In another implementation, multiple variable-size signatures can further be selected for each string object based on multiple non-overlapping, ordered sets of S fixed-size signatures. Each set of S fixed-size signatures has a $J^{th}$ fixed-size signature that has a first basic unit in a scanning direction at an offset of $(J+k*S)$ within the string object for $J=0, 1, 2, \ldots, S-1$ and a non-negative integer k, such that the number of the resultant variable-size signatures for each string object is $S^n$, where n is the number of the non-overlapping, ordered sets of S fixed-size signatures. Each of the $S^n$ resultant variable-size signatures for a string object can be selected by taking one fixed-size signature from each set of S fixed-size signatures and composing them with one or more variable-size strings such that the particular string object is identifiable at any location within any string fields to be scanned. Each of the original fixed-size signatures in the n sets of S fixed-size signatures can then be a fixed-size signature substring of multiple resultant variable-size signatures. In one implementation, the variable-size signatures can be scanned without using a fingerprint. In another implementation, a fingerprint can be selected and then scanned for each fixed-size substring of a variable-size signature.

In one implementation, to support a scan step size of S basic units, P fixed-size signatures can be selected for a particular string object and one or more fingerprints can be further selected for each of the P fixed-size signatures such that the total number of fingerprints for each string object is equal to S. The S fingerprints for a particular string object have a $J^{th}$ fingerprint that has a first basic unit in a scanning direction at an offset of $(J+k*S)$ within the particular string object for $J=0, 1, 2, \ldots, S-1$ and a non-negative integer k such that the particular string object is identifiable at any location within any string fields to be scanned. In another implementation, multiple variable-size signatures can further be selected for each string object based on multiple non-overlapping, ordered sets of fixed-size signatures. An $i^{th}$ set of the non-overlapping, ordered sets of fixed-size signatures has $P_i$ fixed-size signatures and each of the $P_i$ fixed-size signatures further has one or more fingerprints such that the total number of fingerprints for the $i^{th}$ set of fixed-size signatures is equal to S for $i=0, 1, 2, \ldots, n-1$, where n is the number of the non-overlapping, ordered sets of fixed-size signatures, and each set of fixed-size signatures has a $J^{th}$ fingerprint that has a first basic unit in a scanning direction at an offset of $(J+k*S)$ within the particular string object for $J=0, 1, 2, \ldots, S-1$ and a non-negative integer k. Each of the multiple variable-size signatures for a particular string object can be selected by taking one fixed-size signature from each set of fixed-size signatures and composing them with one or more variable-size strings such that the number of resultant variable-size signatures is $P_0*P_1*P_2 \ldots *P_{n-1}$ and the particular string object is identifiable at any location within any string fields to be scanned. Each of the original fixed-size signatures in the n sets of fixed-size signatures can then be a fixed-size signature substring of multiple resultant variable-size signatures.

After signatures, fingerprints, and shadow spaces of each string object in a scan system are determined, the shadow of a fingerprint can be scanned as a whole. The shadows of fingerprints of different lengths can be scanned either sequentially or in parallel. In one implementation, the fingerprints of different lengths are scanned as a whole and sequentially. In one implementation, inserting a string signature into the signature database can be performed using the following pseudo-code:

```
For (i = 0, i < S-1, i++)
{
   {fingerprint shadow_i, h_i} = fingerprint selection(string signature);
   k_i = h_i/S;
   Previous hash value = IV;
   For (j = 0, j < k_i-1, j++)
   {
      Hashed length = j*S;
      Current hash string = fingerprint shadow_i[hashed length, hashed
      length+S-1];
      Current hash value = hash (current hash string, previous hash value);
      Previous hash value = current hash value;
   }
   If (i = 0), signature search pointer = signature insertion (string
   signature);
   Fingerprint insertion (current hash value, signature search pointer);
}
``` where the S is the scan step size, the $h_i$ is the length of $i^{th}$ fingerprint of a string signature, IV is the initial hash value, and the hash( ) is the sequential hash function. The fingerprint selection( ) selects the optimal fingerprint for each shift location, the signature insertion( ) creates the signature search data structure for fixed-size signature search engine 160 and variable-size signature search engine 180 for the signature, and the fingerprint insertion( ) inserts the fingerprint into the fingerprint database 148. When the scan step size is more than one, one fingerprint insertions is required for each of the fingerprints of a string signature. However, only a single signature insertion( ) is necessary for all the fingerprints of a string signature, because all the fingerprint entries of the string signature point to a same signature search data structure.

In one implementation, deleting a string signature from the signature database can be performed using the following pseudo-code:

```
For (i = 0, i < S-1, i++)
{
  k_i = h_i/S;
  Previous hash value = IV;
  For (j = 0, j < k_i-1, j++)
  {
    Hashed length = j*S;
    Current hash string = fingerprint shadow_i[hashed length, hashed
    length+S-1];
    Current hash value = hash (current hash string, previous hash value);
    Previous hash value = current hash value;
  }
  Signature search pointer = fingerprint deletion (current hash value);
  If (i = 0), signature deletion (signature search pointer, string signature);
}
``` where S is the scan step size, the $h_i$ is the length of $i^{th}$ fingerprint, IV is the initial hash value, and the hash( ) is the sequential hash function. The fingerprint deletion( ) deletes the fingerprint from the fingerprint database 148, and the signature deletion( ) deletes the signature search data structure for fixed-size signature search engine 160 and variable-size signature search engine 180 for the signature. To delete a signature from the signature database, multiple fingerprint deletions are required because there are multiple fingerprints for a single signature when the scan step size is more than one. However, only a single signature deletion is necessary for all the fingerprints of a particular signature.

In one implementation, a fingerprint can be further broken into multiple segments in order to gain the scan efficiency, because the number of unique lengths of fingerprint segments is typically much less than the number of unique lengths of fingerprints. All the fingerprint segments of a fingerprint can be first scanned either sequentially or in parallel and the results of the fingerprint segment scanning can then be synthesized together for detecting the fingerprint either sequentially or in parallel. The size of the fingerprint segments can be the same or different, depending on the lengths of the fingerprints for a specific scan engine. In one implementation, the number of segments and the sizes of the segments can be selected according to the lengths of the fingerprints and other scan parameters for a specific scan engine. In another implementation, the lengths of the fingerprints are selected linearly and all the fingerprint segments have a same size. Typically the size of a fingerprint segment is one or multiple times the scan step size. In another implementation, the scan step size is a multiple of a fingerprint segment size for scanning and multiple fingerprint segments are synthesized in parallel.

In one implementation, the fingerprint database can be one or more of one or more bloom filters and one or more hash tables. Typically, using either the hash table or the bloom filter results in a trade off between memory efficiency and memory bandwidth. When the number of the string signatures can fit into on-chip memories that provide sufficient memory bandwidth, the bloom filter or even multiple hash tables may be preferred. Alternatively, when the number of string signatures is large such that off-chip memory is required, the memory bandwidth is the main constraint and thus the hash table may be preferred instead of the bloom filter.

In one implementation, additional bits of hash value are stored with a bloom filter or a hash table for hash value multiplexing. In another one implementation, fingerprint length can be stored with a bloom filter or a hash table for fingerprint length multiplexing. The hash value multiplexing as well as fingerprint length multiplexing can further reduce the false positive and collision chance when the original hash key is too large or too costly to be compared during the fingerprint scanning.

In one implementation, after the shadow spaces, fingerprints, fingerprint segments, and fingerprint data structure have been determined, a fixed-size string signature or substring of a variable-size string signature can be inserted into the fingerprint database 148 and thus the signature database either as a whole or in segments in the shadow spaces.

In one implementation, the fragments other than the fingerprints of a fixed-size string signature or substring of a variable-size string signature can be encoded and stored into fixed-size signature database 166 for scanning through the entire fixed-size string signature or substring after a fingerprint is matched. In one implementation, one or more fragments of a fixed-size string signature or substring of a variable-size string signature are encoded with one or more per basic unit or sub-basic unit masks for string signatures matching particular criteria, (e.g., "don't care", "equal", "unequal", "case-insensitive", "case-sensitive", "in a range", "out of a range") resulting in multiple masked fragments. In another implementation, one or more per fragment masks or per fixed-size signature or signature substring masks are used with or without one or more per basic unit or per sub-basic unit masks for improving storage efficiency.

In one implementation, the masked fragments can then be linked together by a linked list either in-order or out-of-order of the string signature or complied into other search structures (e.g., trees). In one implementation, the lengths of the masked fragments can be variable or fixed size for all the masked fragments. The length of the masked fragments can be selected optimally for a particular memory architecture.

In another implementation, a group of string signatures can be further encoded differentially against one another to form a differential data structure (e.g., differential trees), in order to reduce the number of possible signatures to zero or one quickly, in addition to let the false positive of detecting a string signature converging to zero as fast as possible. The differential tree can be constructed using the different basic units among the string signatures.

In one implementation, signature database pre-processing is performed only during initial signature database creation, when adding one or more new signatures, or when deleting one or more existing signatures. In one implementation, the signature database can be updated dynamically during the signature scanning.

Scan Pre-Processing on String Field

The scan pre-processing engine 120 pre-processes string fields into different formats in according to string signature database to simplify and accelerate the processing in a later pipelined stage. In one implementation, the signatures in the signature database are not stored in an encoded format. Therefore, a decoding process can be applied by the scan pre-processing engine 120 to an encoded string field to match the decoded format of the signatures in the signature database. As illustrated in FIG. 1A, the scan pre-processing engine 120 includes a scan feeder 122, a string field memory 124, a format decoder 126, a decoded field memory 128, a shadow translator 130, and a shadow field memory 132. The scan feeder 122 loads data to be scanned from the string field memory 124 to the format decoder 126. The format decoder 126 performs decoding, parsing and decompressing, which can include MIME decoding, UU decoding, foreign language decoding, removing unnecessary string data including meaningless string data (e.g., extra white space) and anti-scan junk string data (e.g., injected anti-scan junk data), HTML parsing, XML parsing, deflate decompressing, LZS decompressing, PKZip decompressing, and gzip decompressing. The format decoder 126 can normalize the string field according to requirements of a particular system. After decoding and normalizing the string field, the format decoder 126 can store the decoded data in the decoded field memory 128.

The shadow translator 130 translates the decoded data into one or more shadow spaces and stored the shadow data in the shadow field memory 132. For example, a signature database can include case-insensitive signatures. To support case-insensitive signatures, the shadow translator 130 translates the data from the decoded field memory 128 into all-lowercase and stores the lowercase string fields into the shadow field memory 132. The all-lowercase string fields are used for the fingerprint scanning by the fingerprint scan engine 140. Both case-sensitive and case-insensitive signatures can then be scanned at substantially the same time. A match for a case-sensitive signature can be verified using, e.g., the case-sensitive decoded field after detecting a case-insensitive signature shadow.

In one implementation, the scanning system 100 includes computing resources or network equipment that allow string signature scanning to be performed on an entire string field. However, in another implementation, the scanning system 100 includes computing resources or network equipment that is unable to buffer an entire string field due, for example, to system limitations of memory space and low latency requirements. As a result, the string field can be broken into a number of predefined blocks. The string signature scanning can then be performed on each predefined block.

In one implementation, the size of a block is determined by the maximum string signature size. The block of data can be further broken up into three regions: one region for fingerprint scanning for covering all signature scan locations, one region in advance of the fingerprint scanning region for reference data in advance of or within the fingerprint, and one region behind the fingerprint scanning region for reference data behind or within the fingerprint. The union of all the fingerprint scanning regions for a particular string field covers all possible starting locations for the fingerprints within the string field. The three regions can have either a same size or different sizes.

In one implementation, a minimum size of the region in advance of the fingerprint scanning region can be a maximum fingerprint offset of all fingerprints in the signature database, while the minimum size of the region behind the fingerprint scanning region can be the maximum difference of signature lengths and fingerprint offsets of all fingerprints in the signature database and the minimum size of the fingerprint scanning region is the scan step size.

In one implementation, the scan block size can be selected according to the parameters of the scanning system, such as the maximum signature size, the memory structure, and the scan speed. The scan block size can be a few times, e.g., 2-4 times, the maximum signature size when the maximum signature size is large. For a smaller maximum signature size, the multiple factor can be larger.

In one implementation, the three regions have a same size equaling the maximum string signature size. The three regions can be placed into three memory banks forming a ring for minimizing data movement in memory. In another implementation, the three regions have different sizes and the region in advance of the fingerprint scanning region is smaller than the other two regions that can have a same size or different sizes.

In another implementation, to minimize data movement in memory, each region of the three regions of a scan block can be placed into one or more memory banks that have a same size and where all the banks for all three regions form a ring that starts at the first bank of the region in advance of the fingerprint scanning region and ends at the last bank of the region behind the fingerprint scanning region. After scanning the first bank of the fingerprint scanning region, the first bank of the ring will exit the ring and the bank will be available for loading new data. After loading the new data, the bank will then enter the ring again as the last bank. In one implementation, one or more additional banks can be added into the ring at the end of the ring for buffering new data.

In one implementation, the string field memory 124 includes the last memory bank only and thus the size of the string field memory 124 equals the size of a memory bank. Both the decoded field memory 128 and the shadow field memory 132 include all memory banks for the three regions and thus their size equals the size of all the memory banks.

Special conditions exist for the first and the last blocks due to boundary conditions. In one implementation, impossible basic units of the maximum signature size can be padded into the reference area before the fingerprint scan area of the first block and after the fingerprint scan area of the last block. Impossible basic units include data which no signature sequence begins or ends with, thus the padded reference area cannot be part of an actual signature. The padding is not needed if a valid range checking mechanism is added into the fingerprint scan engine 140, fixed-size signature search engine 160, and variable-size signature search engine 180. The range checking mechanism prevents scanning beyond a string field boundary.

Fingerprint Scanning

In one implementation, the fingerprint scan engine 140 can include one or more of one or more content addressable memories (CAM) and one or more finite automata (FA). In another implementation, when fingerprints are fully specified either originally or after mapping into one of shadow spaces, the fingerprint scan engine 140 can be a hash-based engine. As illustrated in FIG. 1A, in one implementation, the fingerprint scan engine 140 includes a fingerprint scan controller 142, a fingerprint hash engine 144, a fingerprint search engine 146, a fingerprint database 148, and a fingerprint synthesis engine 150. In one implementation, a fingerprint is scanned as a whole. The fingerprint synthesis engine 150 is an optional component for implementations in which the fingerprint is scanned as a whole.

In another implementation, each fingerprint is broken up into multiple segments that are first scanned independently. All the segments of a fingerprint can be first scanned and then synthesized (e.g., using the fingerprint synthesis engine 150) either sequentially or in parallel to generate scanning results of the fingerprint. In one implementation, the fingerprint scan controller 142 controls the entire scan processing.

The fingerprint scan engine 140 can return a result of no matches or a matched entry in the fingerprint database. The matched entry corresponds to one or more string signatures that can subsequently be searched by the fixed-size signature search engine 160 and the variable-size signature search engine 180. The scanning process is completed if there is no matched entry.

In one implementation, the fingerprint hash engine 144 includes multiple independent universal hash functions, $h_0$, $h_1, \ldots, h_f$, to support bloom filters. Bloom filters can be used, for example, when the memory size rather than the memory bandwidth is constrained. For example, memory size can be constrained in a scanning system where the signature database is small enough to fit into on-chip memory.

In another implementation, the fingerprint hash engine 144 includes multiple independent universal hash functions, $h_0$, $h_1, \ldots, h_f$, to support multiple hash tables. Multiple hash functions or tables can be used, for example, when an extremely low false positive is desired (e.g., $10^{-3}$ or less), the memory bandwidth is high, and the memory size is sufficiently large. For example, an extremely low false positive is desired when a slow off-chip memory such as a DRAM is used for the follow-on data structure while there is sufficient on-chip memory for multiple hash tables. In another implementation, the fingerprint hash engine 144 includes a single hash function $h_0$. A single hash table can be used, for example, when the memory bandwidth rather than the memory size is constrained. For example, memory bandwidth can be constrained when the signature database is large such that an off-chip memory is used.

The fingerprint hash engine 144 takes n-bytes of data from the shadow field memory 132 and hashes the data. The data can be hashed alone or with either initial random values (IV) or previous hash values to generate current hash values for all of the hash functions. In one implementation, one of the hash functions, for example, the first hash function $h_0$, generates more bits of the hash value than the other hash functions that generate the same number of bits of hash values.

The hash values from the hash functions can be used to search through the fingerprint database 148 using the fingerprint search engine 146. In one implementation, the fingerprint search engine 146 includes a bloom filter and a hash de-multiplexer. The bloom filter checks all the valid bits indexing by the hash values. If all the valid bits are set, the hash de-multiplexer searches through a corresponding hash bucket for a hash value that has extra bits. The de-multiplexing is performed by checking the extra bits of a particular hash value, with or without fingerprint length and other information about the fingerprint. The hash de-multiplexer can further reduce false positive signature match results. In one implementation, the bloom filter can be reduced into a hash table. In another implementation, the bloom filter can be expanded into multiple hash tables.

The fingerprints of different lengths can be scanned either in parallel or sequentially. In one implementation, multiple fingerprint search engines 146 can be used to scan in parallel. For example, one fingerprint search engine 146 can be used for scanning each different fingerprint length.

In another implementation, a single fingerprint search engine 146 can perform a sequential fingerprint scan on multiple fingerprint lengths. For example, the lengths of the fingerprints can be a multiple of the scan step size. For each fast string signature scan engine 100, there is a valid set of fingerprint lengths, {S, 2*S, 3*S, ..., m*S}, where S is the scan step size and m*S is the maximum fingerprint size. At each scan location, the fingerprints of different lengths are scanned sequentially. A sequential hash function that applies to an s-unit substring of the fingerprints can be used for the scanning. In one implementation, sequential fingerprint scanning of the fingerprint scan engine 140 can be described with the following pseudo-code:

```
k = [t/S];
For (i = 0, i < k-1, k++)
{
    Scan position = i*S;
    Previous hash value = IV;
    For (j = 0, j < m-1, j++)
    {
        Hashed length = j*S;
        if (scan position + hashed length < t)
        {
            Current hash string = string field[scan position + hashed length,
                                 scan position + hash length + S - 1];
            Current hash value = hash (current hash string, previous hash
            value);
            Signature search pointer = fingerprint database search(current hash
                                 value);
            Signature ID = signature search (signature search pointer);
            Previous hash value = current hash value;
        }
    }
}
``` where S is the scan step size, m*n is the maximum fingerprint size, t is the total length of string field to be scanned, IV is the initial hash value, and the hash( ) is a sequential hash function. The fingerprint database search( ) is performed in the fingerprint search engine 146 and the fingerprint synthesis engine 150, while the signature search( ) is performed in the fixed-size signature search engine 160 and variable-size signature search engine 180.

Figure 2A:
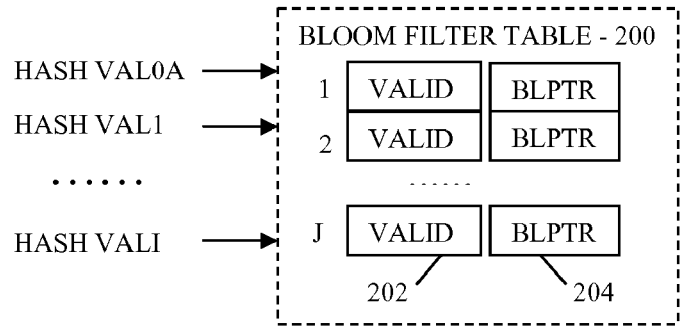
FIGS. 2A-2C illustrates example data structures of a fingerprint database.
Figure 2B:
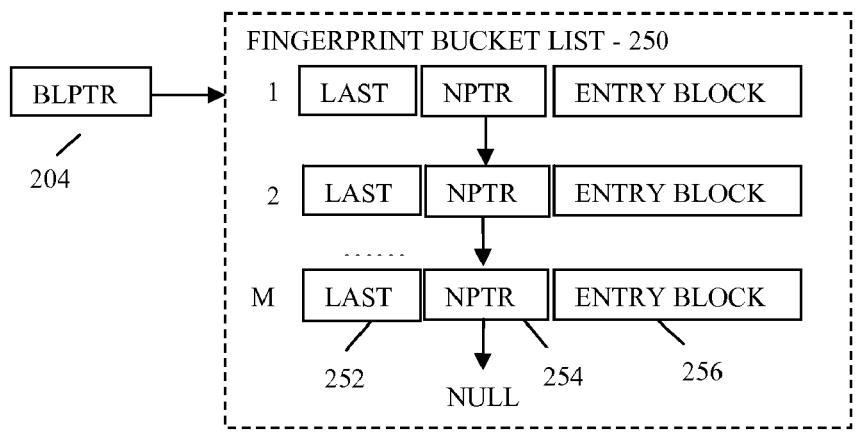
Figure 2C:
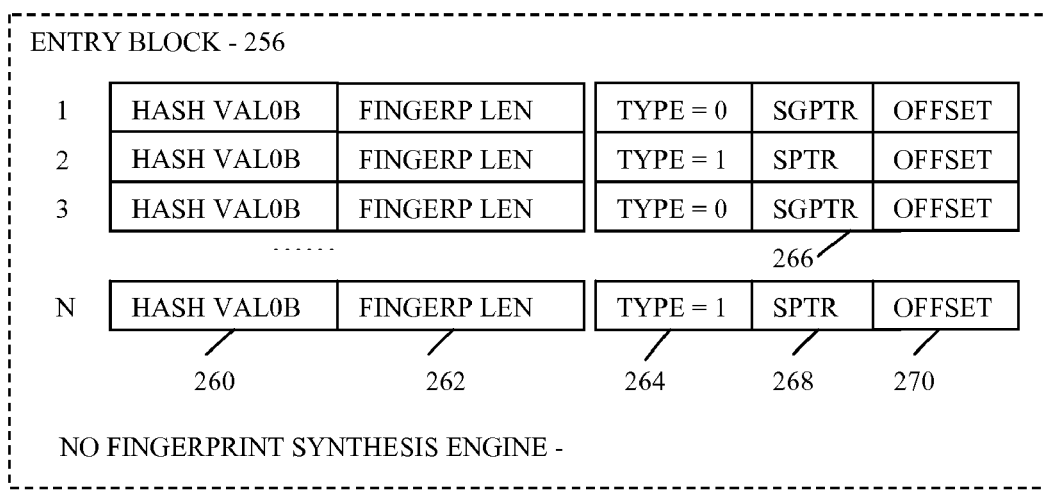

FIGS. 2A-C illustrate example data structures of fingerprint database 148 that include a bloom filter table 200, a fingerprint bucket list 250, and a hash entry block 256, when fingerprints of different lengths are scanned as a whole. By using the hash values, {hash value0a, hash value1, ..., hash valuei}, from the fingerprint hash engine 144, the hash fingerprint search engine 146 indexes into the bloom filter table 200. Each entry of the bloom filter table 200 includes a valid flag 202 and a bucket list pointer ("blptr") 204. The valid flag 202 is a flag that is set when there is at least one string signature in the entry. In one implementation, the blptr 204 is only valid for the hash value0a and is a bucket list pointer for a header of the fingerprint bucket list 250. If all the bits of valid flag 202 indexed by all the hash values are set, further fingerprint scanning can be performed on the fingerprint bucket list 250 pointed to by the blptr 204. In another implementation, the blptr 204 is selected the same as the hash value0a so that it can be omitted for reducing the size of a bloom filter table or a hash table at the cost of larger storage for the followed-on data structures.

In one implementation, the fingerprints are inserted into an entry of the bloom filter table 200 using the hash value0a, while the other hash values can be used to reduce the false positives. Additionally, to delete a string signature without affecting other string signatures, a counter for each entry can be used for tracking a number of signatures in the entry. In another implementation, the bloom filter table 200 can be reduced into a hash table with only one hash value (e.g., hash value0a). In another implementation, the bloom filter table 200 can be expanded into multiple hash tables.

In one implementation, the fingerprint bucket list 250 is a linked list. Each element of the fingerprint bucket list 250 includes a last flag 252, a next element pointer ("nptr") 254, and an entry block 256. The nptr 254 points to a next element of the fingerprint bucket list 250. When a tail of the fingerprint bucket list 250 is reached, the last flag 252 is set. The last flag 252 is an optional bit introduced for fast detection of the tail because the tail can also be detected by checking if the nptr 254=NULL. Each entry block 256 includes up to n fingerprint entries, where n is any integer larger than 0. In one implementation, an optimal n can be selected based on the memory architecture of the scanning system. For example, for a SRAM architecture, n can be equal to one, while n>1 can be used for a DRAM architecture.

In one implementation, each fingerprint entry in the entry block 256 of the fingerprint bucket list 250 includes a hash value ("hash val0$b$") 260, a fingerprint length ("fingerp len") 262, a type 264, a signature group pointer ("sgptr") 266 or signature pointer ("sptr") 268, and an offset 270 as illustrated in FIG. 2C. The hash val0$b$ 260 and fingerp len 262 are introduced for hash value multiplexing and fingerprint length multiplexing, respectively. When the type 264=0, a sgptr 266 is returned for a signature group; otherwise, a sptr 268 is returned for a single signature. The offset 270 is the offset from the header of the fingerprint to the next basic unit to be compared or the header of the next substring to be compared. The offset 270 is not required if there is no the next data structure. The offset 270 can be set to 0, when not required for the next data structure. In another implementation, a valid bit can be added into each fingerprint entry in the entry block 256 for n>1. The hash val0$b$ 260 and the fingerp len 262 can also be checked when the valid bit is set.

In one implementation, each fingerprint entry in the entry block 256 is designed for storing a single fingerprint. However, in another implementation, because the original fingerprints can be very long, have different sizes, and because there are more signature search stages after the fingerprint database search, the original fingerprint is not included in each fingerprint entry. As the result, each matched fingerprint entry can include either no fingerprint due to the probability of a false positive or more than one fingerprint due to the probability of a fingerprint collision.

When a simple hash table rather than a bloom filter table is used for the fingerprint scanning, the probability of a false positive is substantially on the order of $(k/2^m)$ and the probability of a fingerprint collision is substantially on the order of $(k^2/2^{2m})$ for $(k/2^m) \ll 1$, where the k is the number of fingerprints in total and the m is the number of bits in the hash value0 that includes the hash value0$a$ and hash value0$b$. The probabilities can substantially decrease when a bloom filter table is used. The probabilities can further decrease when multiple hash tables are used. To minimize signature searches at later stages, both the probability of a false positive and the probability of a fingerprint collision can be reduced to substantially zero. In one implementation, sufficiently large m and number of hash functions can be selected to minimize the probability of a false positive and the probability of a fingerprint collision.

To reduce storage space, in one implementation, multiple hash values can be multiplexed into a single fingerprint database to reduce the probability of an empty entry. Each hash value can be broken into two pieces: hash value1 of m1 bits and hash value2 of (m-m1) bits. The hash value1 can be used for indexing into a fingerprint database, while the hash value2, (e.g., hash val0$b$ 260), can be used for resolving the hash collisions and the false positives. The smaller the value of m1, the less the required storage space, but the longer the fingerprint bucket list 250. In one implementation, the average length of the fingerprint bucket list is less than 1 when $2^{m1}$ is substantially 2 or more times k.

To save storage space and reduce the complexity of the table management, in another implementation, all the fingerprints of different lengths can be multiplexed into a single fingerprint database. The fingerprint length, fingerp len 262, can be introduced to further reduce the probability of a false positive and the probability of a fingerprint collision.

The search data structures illustrated in FIGS. 2A-C can be implemented in several different ways. A particular implementation can be selected based on the size of signature table, the available memory sizes and their types such as on-chip SRAM, on-chip DRAM, off-chip SRAM, and off-chip DRAM. For example, in one implementation, if the size of the signature table is 128K, the valid flag 202 can be put in an on-chip SRAM for faster access. The blptr 204 can be put into a table in an off-chip SRAM. The valid flag 202 is accessed by all the hash values, while the blptr 204 is only indexed by the hash value, hash val0$a$. The blptr 204 is accessed, only when each valid flag 202 for all the hash values are set. The last 252 and nptr 254 can be put in a table in an off-chip SRAM and the hash val0$b$ 260 and fingerp len 262 can be put in another table in an off-chip SRAM or DRAM, while the type 264, sgptr 266, sptr 268, and offset 270 are put in another table in an off-chip DRAM. The type 264, sgptr 266, sptr 268, and offset 270 can be accessed when both the hash val0$b$ 260 and fingerp len 262 are matched.

In one implementation, to gain scanning efficiency, a fingerprint of a string signature can be broken up into multiple segments that are first scanned either sequentially or in parallel and then synthesized by the fingerprint synthesis engine 150 to generate the scanning results of the fingerprint. Breaking up the fingerprint of a string signature into multiple segments for scanning can speed up the fingerprint scanning because the number of unique fingerprint segment lengths is typically much smaller than the number of unique fingerprint lengths or reduce the false positive for supporting longer fingerprints that include more fingerprint segments.

In one implementation, the fingerprint segment synthesizing is exact or complete without a false positive. In another implementation, to accelerate the fingerprint scanning, the fingerprint segment synthesizing is "coarse" or partial with false positives. To reduce the probability of a false positive, information regarding one or more of possible locations and possible lengths of each fingerprint segment can be stored and used for synthesizing the fingerprint segments into any fingerprint matches in parallel or sequentially.

Figure 2D:
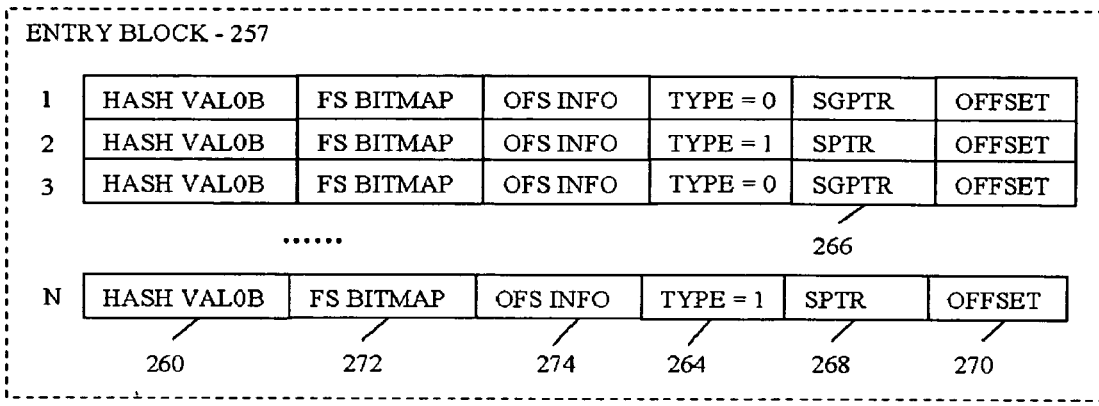
FIGS. 2D-E illustrates example data structures of a hash entry block and an implementation of a fingerprint synthesis engine.
Figure 2E:
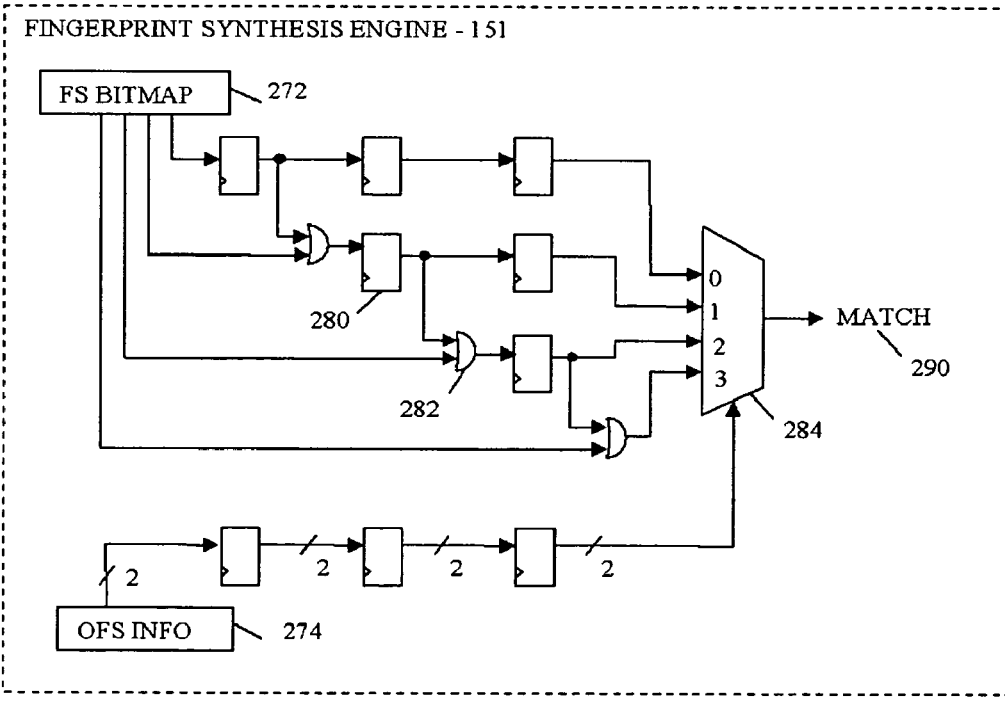

FIGS. 2D-E illustrates example data structures for the entry block and corresponding fingerprint synthesis engine for generating scanning results when multiple fingerprint segments are scanned sequentially for the case where there is at-least-one match. In one implementation, a match will be reported as far as at least one fingerprint is detected, but no information regarding how many fingerprints are matched and the length of the fingerprint is reported.

As illustrated in FIG. 2D, in one implementation, each entry in the entry block 257 includes a hash val0$b$ 260, a fingerprint segment bitmap ("fs bitmap") 272, an at-least-one match fingerprint synthesis information ("ofs info") 274, type 264, sgptr 266 or sptr 268, and offset 270 for a particular fingerprint segment. The fs bitmap 272 is a valid bitmap array and where the number of bits is the same as the number of the fingerprint segments supported by the fingerprint synthesis engine 151. The $i^{th}$ bit in a fs bitmap 272 is set when the entry is an $i^{th}$ segment of a fingerprint. The fs bitmap 272 specifies all possible locations of the segment in any fingerprints. The ofs info 274 is the fingerprint synthesis information for the at-least-one match case specifying how many segments are in the shortest fingerprint that includes the segment. In one implementation, the ofs info 274 is stored in the first segment of the fingerprint. In another implementation, the ofs info 274 or any other fingerprint length information is stored in each fingerprint segment of the fingerprint. In another implementation, the ofs info 274 is omitted.

In one implementation, the hash val0$b$ 260 is the same as in FIG. 2C. The type 264, sgptr 266, sptr 268, and offset 270 are also the same as those in FIG. 2C, are stored with the first segment of a fingerprint, and are used after delaying by the number of segments less 1 clock cycle. In one implementation, because the type 264, sgptr 266, sptr 268, and offset 270 fields are only stored in the first segment, all the fingerprints sharing the same first segment are stored together. In one implementation, the chance of multiple fingerprints sharing the same fingerprint segment is minimized during the selection of the fingerprint.

FIG. 2E illustrates an implementation of the corresponding fingerprint synthesis engine 151 when the ofs info 274 is only stored in the first segment of each fingerprint. In one implementation, the fingerprint segment size is selected to be the same as the scan step size. For example, both the fingerprint segment size and scan step size can be equal to four such that the lengths of the fingerprints are 4, 8, 12, and 16. The fingerprint synthesis engine 151 includes twelve D flip-flops 280, three 2-input AND gates 282, and a 4-input MUX 284. Input is provided by the fs bitmap 272 and the ofs info 274. The fingerprint synthesis engine 151 outputs a match 290 if a fingerprint is found. The match 290 is only valid when the first segment of a synthesized fingerprint is the first segment of a fingerprint. In one implementation, to validate the match 290, the 4-input MUX 284 is replaced by a 5-input MUX with a new input tied to zero for segments that are not the first segment of a fingerprint.

In one implementation, the fingerprint synthesis engine 151 can be expanded to support additional fingerprint length information for the segments other than the first segment of a fingerprint by adding additional gates for the additional fingerprint length information at different delay stages. In another implementation, when the ofs info 274 is not stored with any fingerprint segment, the fingerprint synthesis engine 151 can be simplified by removing the MUX 284 and all the gates that are not for the shortest fingerprint length in a signature database. In another implementation, the fingerprint synthesis engine 151 can be easily modified for other scan step sizes, number of fingerprint segments, and lengths of the fingerprints. In one implementation, the fingerprint synthesis engine 151 can output one fingerprint scanning result at every clock cycle, since multiple fingerprint matches can be collapsed into a single at-least-one match.

Figure 2F:
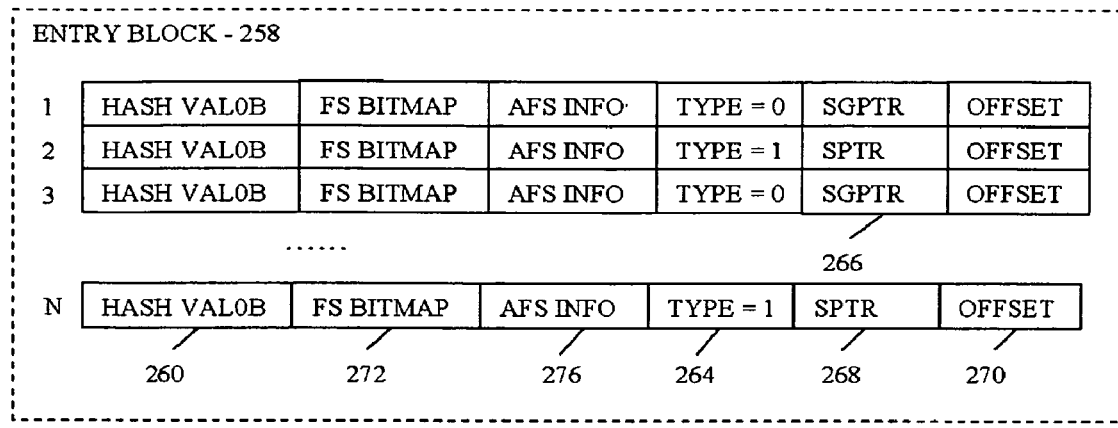
FIGS. 2F-2G illustrates example data structures of a hash entry block and an implementation of the corresponding fingerprint synthesis engine.
Figure 2G:
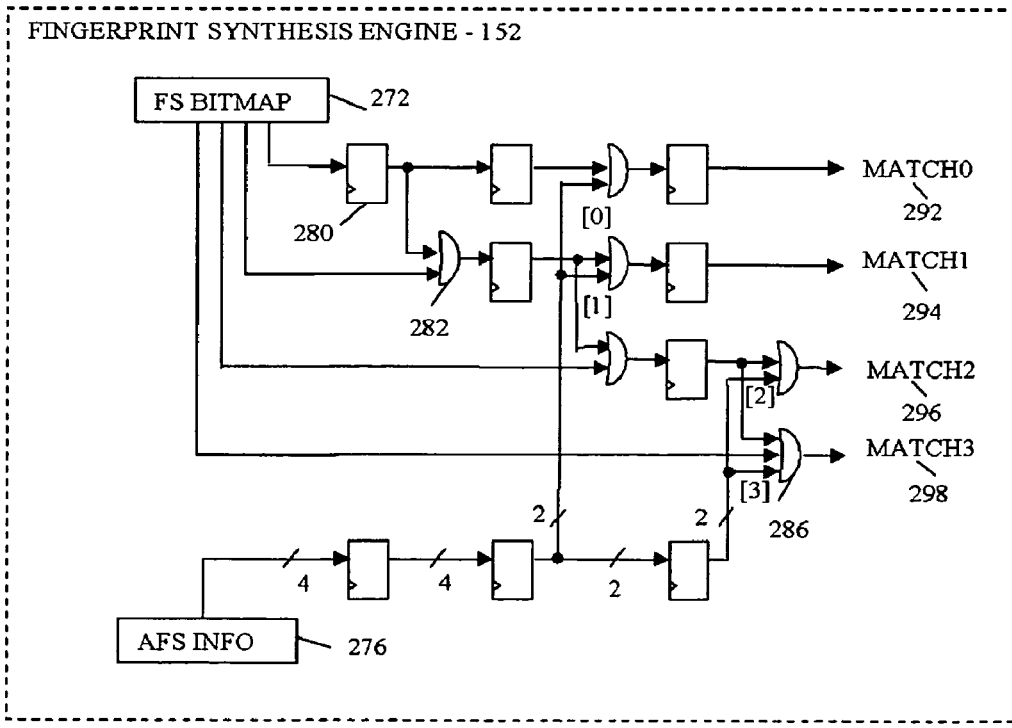

FIGS. 2F-G illustrate an alternative implementation of data structures for the entry block and a corresponding fingerprint synthesis engine for the case in which all detected matches are presented ("all matches" case) when multiple fingerprint segments are scanned sequentially. One or more later stage scans can be required when more than one fingerprint of different lengths are detected as a signature match.

As illustrated in FIG. 2F, each entry in the entry block 258 includes a hash val0$b$ 260, a fs bitmap 272, an all match fingerprint synthesis information ("afs info") 276, a type 264, a sgptr 266 or sptr 268, and an offset 270 for a particular fingerprint segment. The afs info 276 is the fingerprint synthesis information for all matches and the number of bits in the afs info 276 is the same as the number of fingerprint segments supported by the fingerprint synthesis engine 152. The $i^{th}$ bit in the afs info 276 is set when it is a segment of a fingerprint having i segments. The other fields in the entry block 258 correspond to the fields in FIG. 2D. In one implementation, the afs info 276 is only stored in the first segment of the fingerprint. In another implementation, the afs info 276 or any other fingerprint length information is stored in each fingerprint segment of a fingerprint. In another implementation, the afs info 276 is omitted.

FIG. 2G illustrates an implementation of the corresponding fingerprint synthesis engine 152 for a case having more than one fingerprint sizes when the afs info 276 is only stored in the first segment of each fingerprint. The fingerprint synthesis engine 152 uses the same scan step size, fingerprint segment size, and fingerprint lengths as in FIG. 2E. The fingerprint synthesis engine 152 includes sixteen D flip-flops 280, five 2-input AND gates 282, and a 3-input AND gate 286. The fingerprint synthesis engine 152 outputs a match0 292, a match1 294, a match2 296, and a match3 298, for respectively matching a fingerprint of one segment long, two segments long, three segments long, and four segments long. In one implementation, the fingerprint synthesis engine 152 can be expanded to support additional fingerprint length information for the segments other than the first segment of a fingerprint by adding additional logic gates such as AND gates or additional inputs in the existing AND gates at different delay stages.

In another implementation, when the afs info 276 is not stored with any fingerprint segment, the fingerprint synthesis engine 152 can be simplified by removing the inputs of the AND gates for the afs info 276 and all the gates that are not for a fingerprint length in a signature database. In one implementation, the entry block 258 in FIG. 2F can be expanded to have multiple sets of the type 264, sgptr 266 or sptr 268, and offset 270 fields; one set of fields for each fingerprint length. Furthermore, in one implementation, the information regarding the exact length of a fingerprint can also be used in further scanning stages.

The fingerprint synthesis engine 152 can scan all the fingerprints of different lengths. However, because the type 264, sgptr 266 or sptr 268, and offset 270 fields are stored in a single fingerprint segment, all the fingerprints sharing that segment are stored together. Proper selection of the fingerprints for each string signature can minimize the effect. However, to eliminate the effect, the type 264, sgptr 266 or sptr 268, and offset 270 can be stored in another table indexed by all matched segments. All the addresses to the matched segments can be used for locating an entry in the table.

In another implementation, the fs bitmap 272, in addition to the ofs info 274 or the afs info 276, can be further omitted so that no synthesis information is stored with each of fingerprint segments. Fingerprint segments can then be synthesized based on all possible fingerprint formats in the signature database. A fingerprint match is considered as positive if multiple fingerprint segments are satisfied in any one of all the fingerprint formats. For a special case, a fingerprint match is considered as positive if multiple fingerprint segments satisfy the minimum requirements of all the fingerprint formats.

Figure 2H:
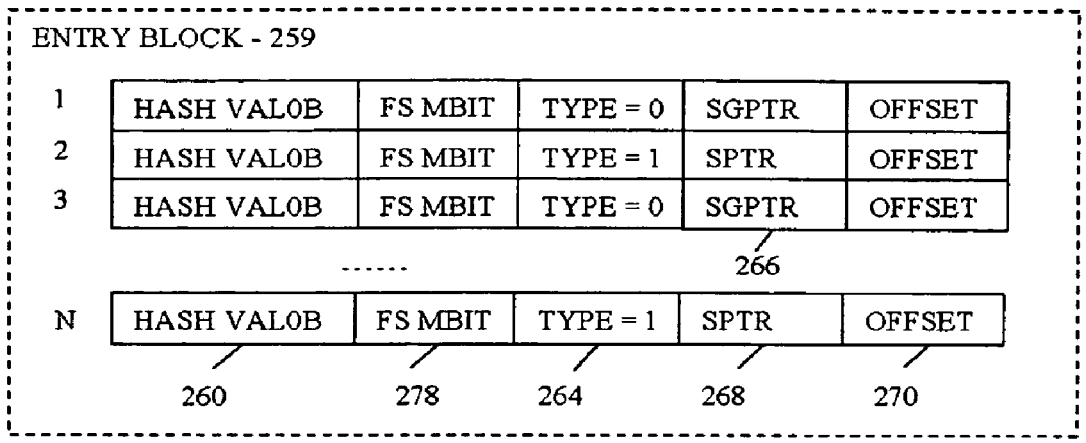
FIGS. 2H-I illustrates example data structures of a hash entry block and an implementation of the corresponding parallel fingerprint synthesis engine.
Figure 2I:
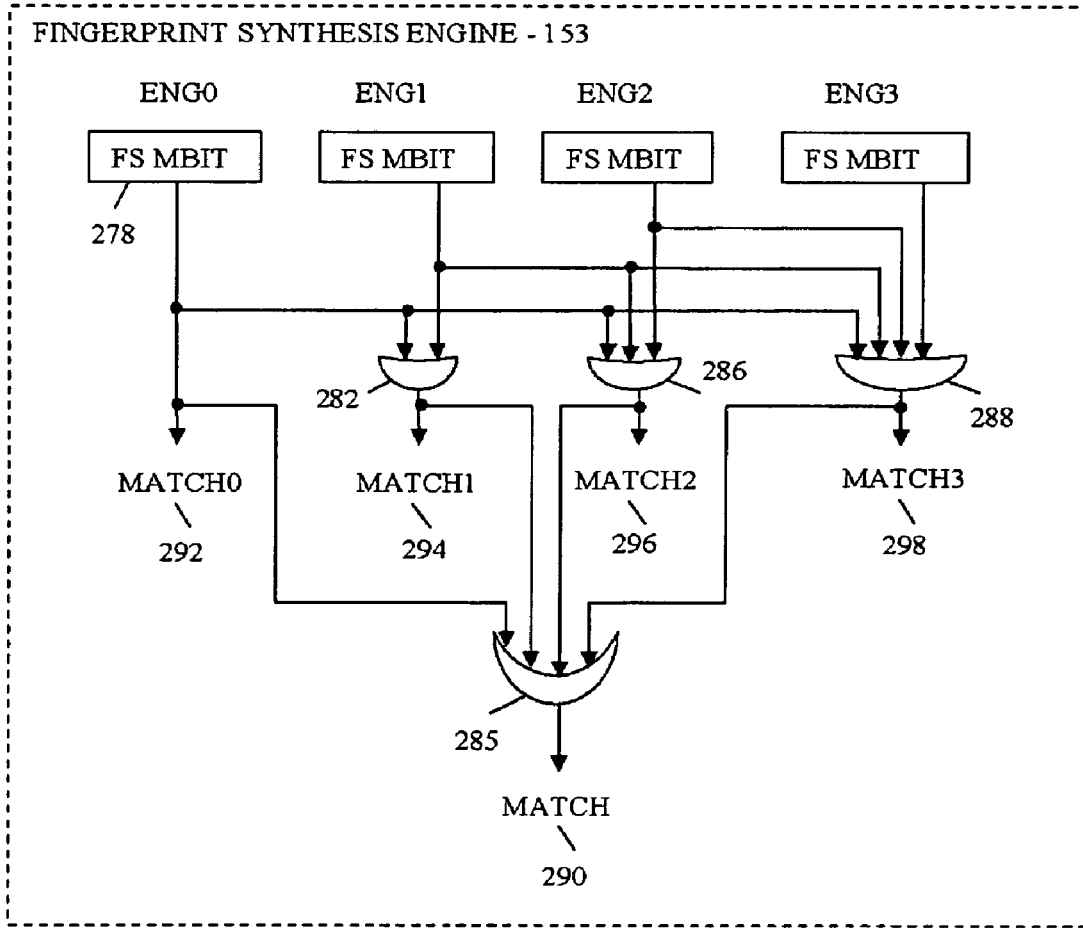

FIGS. 2H-I illustrate another implementation of data structures of an entry block and a corresponding fingerprint synthesis engine operating in parallel for both the at-least-one match case and the all matches case, when multiple fingerprint segments are scanned in parallel. As illustrated in FIG. 2H, each entry in the entry block 259 includes a hash val0$b$ 260, a fingerprint segment match bit ("fs mbit") 278, a type 264, a sgptr 266 or sptr 268, and an offset 270. The fs mbit 278 is a match bit for the fingerprint segment and the other fields correspond to fields in the entry block 257 of FIG. 2D. The fs mbit 278 has specific meaning for a specific engine (i.e., one of ENG0, ENG1, ENG2, or ENG3) of a parallel fingerprint synthesis engine illustrated in FIG. 2I. The fs mbit 278 of the $i^{th}$ engine (i.e., ENGi) is set when the entry is an $i^{th}$ segment of any fingerprints. In one implementation, the $i^{th}$ engine of the parallel fingerprint synthesis engine only stores the $i^{th}$ segments of fingerprints so that the fs mbit 278 is always set and can be omitted. In one implementation, fingerprint length information similar to the ofs info 274 and the afs info 276 can be stored in either the first fingerprint segment of a fingerprint or each fingerprint segment of a fingerprint, to further reduce the false positive syntheses.

FIG. 2I illustrates an implementation of the corresponding fingerprint synthesis engine 153 that operates in parallel, when no fingerprint length information is provided. The fingerprint synthesis engine 153 includes a 2-input AND gate 282, a 3-input AND gate 286, a 3-input AND gate 288, and a 4-input OR gate 285. The fingerprint synthesis engine 153 outputs a match0 292, a match1 294, a match2 296, and a match3 298 for all match cases, while outputting a single match 290 for the at-least-one match case. In one implementation, a global fingerprint length filter can be applied to the match0 292, match1 294, match2 296, match3 298, and match 290 to filter out matches of impossible fingerprint lengths. In one implementation, the fingerprint synthesis engine 153 can be expanded to support fingerprint length information stored in either the first fingerprint segment of each fingerprint or each fingerprint segment of each fingerprint at cost of additional logic gates. In one implementation, the parallel fingerprint segment scanning can speed up the scanning speed for a large scan step size that is multiple times of the size of the fingerprint segment.

In general, in one implementation, each fixed-size signature can be broken up into multiple segments that are first scanned independently. All the segments of a signature can be first scanned and then synthesized either sequentially or in parallel to generate scanning results of the signature, in the same way as scanning and synthesizing fingerprint segments. Typically the number of unique signature segment lengths, if not one, is much less than the number of unique signature lengths so that the scanning speed for scanning methods that required an independent scanning for patterns of each unique length increases accordingly. In one implementation, two or more signature segments of a same length are scanned in parallel.

In one implementation, one or more of one or more hash tables and one or more bloom filters are used for scanning for the signature segments that are fully specified. In one implementation, the fingerprint synthesis engine 150 is used for synthesizing identified signature segments into any signature matches either sequentially or in parallel when there is at least one signature match. The data structures and implementations illustrated in FIGS. 2D-I can be used for synthesizing signature segments. In another implementation, one or more of one or more finite automata (FA) and one or more content addressable memories (CAM) are used for synthesizing identified signature segments into any signature matches.

Fixed-Size Signature Scanning

Referring back to FIG. 1, the fixed-size signature search engine 160 includes a signature finder 162, a signature verifier 164, and a fixed-size signature database 166. The signature finder 162 can identify a potential fixed-size string signature, a potential fixed-size substring of a variable-size string signature, or a potential signature family that includes multiple potential fixed-size signatures or substrings. The potential signature strings or substrings identified by the signature finder 162 can then be fully verified by the signature verifier 164. The fixed-size signature database 166 is a database for the signature finder 162 and the signature verifier 164.

Figure 3A:
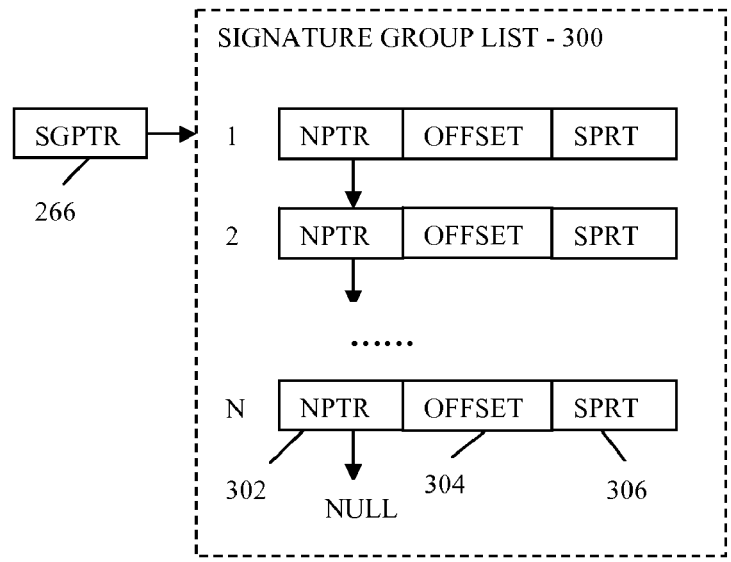
FIGS. 3A-B illustrates example data structures of a signature group list and a signature list for fixed-size signature searching.
Figure 3B:
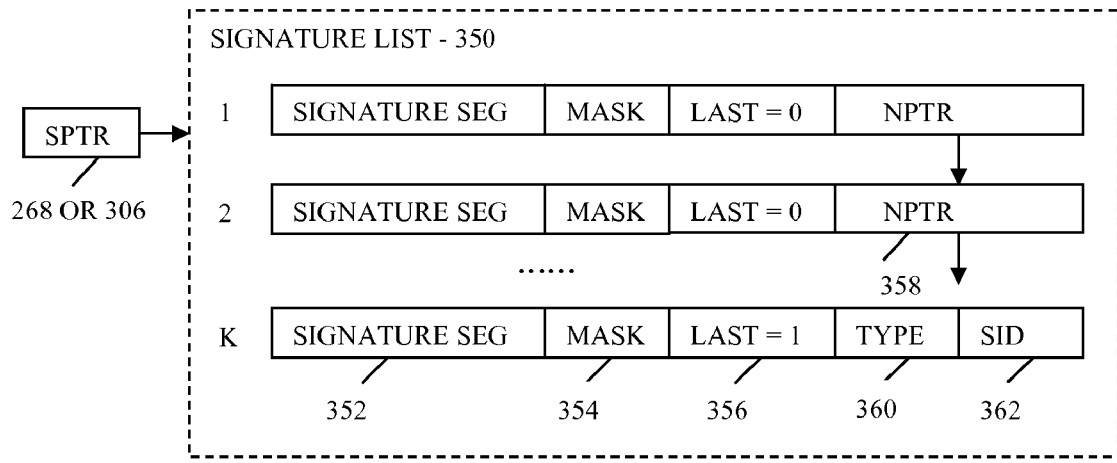

The fixed-size signature database 166 can be implemented in various search data structures. In one implementation, as illustrated in FIGS. 3A-B, the fixed-size signature database 166 is a two dimension linked list, a signature group list 300, formed by linking multiple signature lists 350 together. Each element of the signature group list 300 includes a next element pointer ("nptr") 302, an offset 304, and a signature pointer ("sptr") 306. The nptr 302 is a next point that points to a next element in the signature group list 300, while the sptr 306 points to a particular signature list 350. The offset 304 specifies the offset from a header of a particular fingerprint to the header of a particular string signature pointed to by the sptr 306.

To form a signature list 350, each fixed-size string signature or substring of a variable-size string signature can be broken into multiple signature segments 352. The signature segments 352 can be linked together in the scan order from the first basic unit of a string signature or signature substring. In one implementation, the segments can have a different size. In an alternative implementation, all the segments can have a same size and the size can be optimally selected according to the system architecture. Each element of the signature list 350 includes a signature segment ("signature seg") 352, a mask 354, a last flag 356, a next pointer ("nptr") 358, a type 360, and a signature/string ID ("sid") 362. The nptr 358 is a next pointer and the last flag 356 is a tail flag. When the type 360 has a value of 0, the sid 362 is a string ID 364; otherwise, the sid 362 is a signature ID 366. The mask 354 is used to specify certain criteria including: "don't care", "equal", "unequal", "in a range", "out of a range", "case-insensitive", and "case-sensitive" on the basic unit or even sub-basic unit. Specifying the criteria can be performed by selecting the sources and results of a comparison unit. If a string signature is not a multiple of the segment size, the string signature is padded with, up to (the segment size–1), 0s or any other values at the tail of the string signature and the mask for padding units shall be set to "don't care".

In one implementation, the mask 354 for each basic unit has 3 bits. The first bit is set equal 0 for "case-insensitive" and 1 for "case-sensitive", while the last two bit are set equal to 0 for "equal", 1 for "unequal", 2 for "don't care", and 3 for "reserved". Additional mask bits can be used for selecting any other comparison format, such as a pre-defined range (numerical characters or alphabetic characters), a symbol class, or an arbitrary range as needed. In other implementation, to gain storage efficiency, one or more per fragment or per fixed-size signature or signature substring masks are used with or without the per basic unit or per sub-basic unit masks.

In one implementation, the signature finder 162 can search through the signature group list 300 until a tail, where the nptr 302 has a value of NULL, is reached. For each element of the signature group list 300, a sptr 306 value that points into a signature list 350 is returned.

The signature verifier 164 can perform signature verification for each signature list 350. The signature verifier 164 exams each signature segment one by one in the scan order, starting from the header of the string signature. The signature verifier 164 will exit the signature verification, if no match is found; otherwise, the signature verifier 164 searches through the entire signature list 350 until a tail, where last 356 has a value of 1, is reached. If a match is found, the signature verifier 164 returns a string ID 364 for a substring of a variable-size string signature, if type 360 is 0; otherwise, a signature ID 366 is returned for a fixed-size string signature.

In another implementation, the signature segments 352 can be linked together in an optimal order in order to make the false positive matches converge to zero quickly as the number of segments increases. An offset field specifying the offset between a current segment and a next segment shall be added into each entry of the signature list 350. Although the lengths of the segments can vary from one segment to another segment, a fixed length of segments can be selected.

Figure 4A:
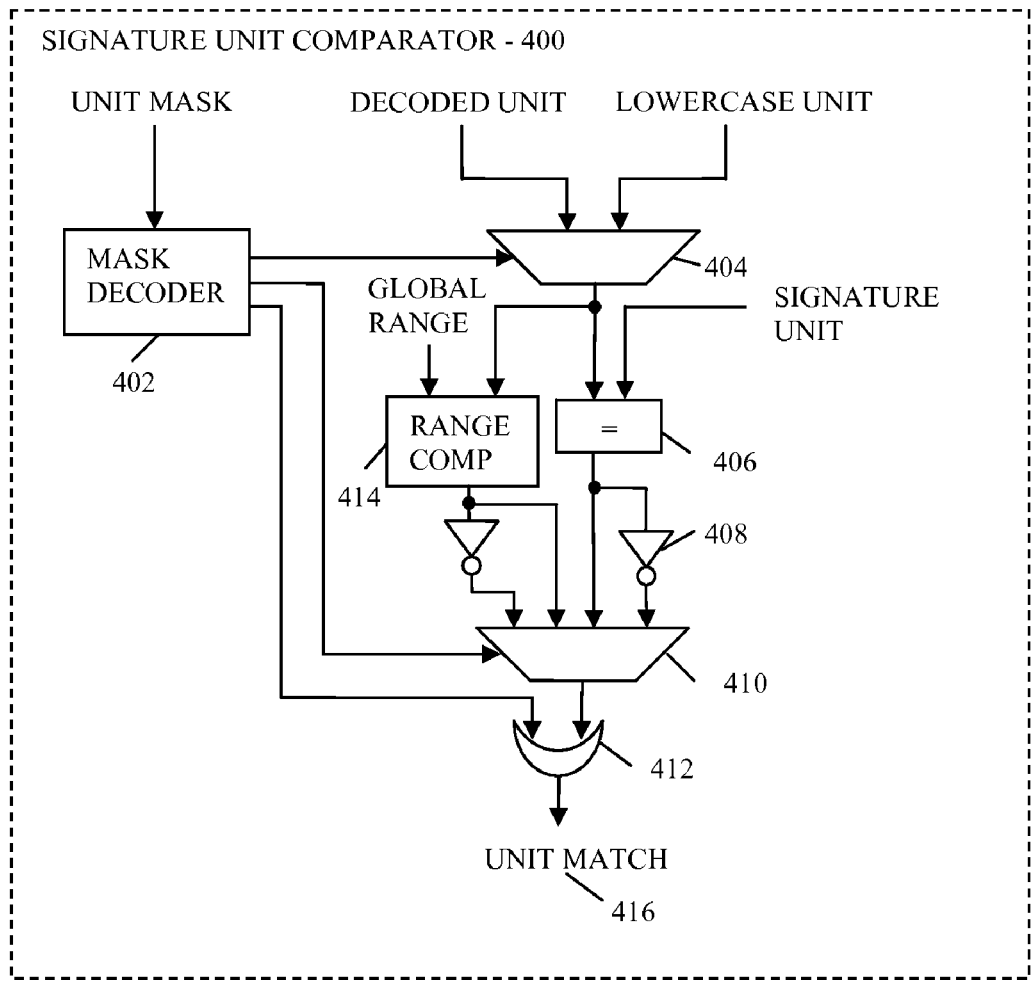
FIGS. 4A-B illustrates block diagrams of an example signature unit comparator and a signature segment comparator for a predefined, global unit range for a string field.
Figure 4B:
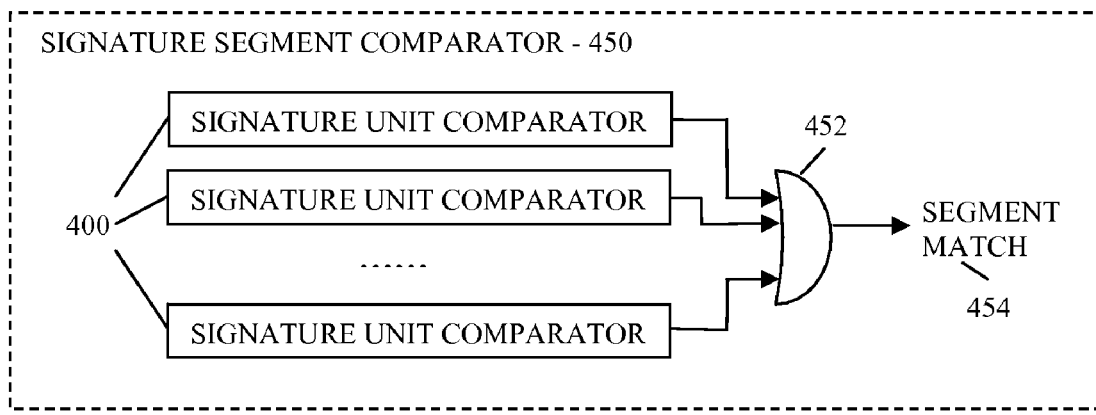

FIGS. 4A-B illustrate block diagrams of an example signature unit comparator 400 and a signature segment comparator 450 in accordance with one implementation. The signature unit comparator 400 can perform the comparisons in the fixed-size signature searches. The signature unit comparator 400 includes a mask decoder 402, a 2-input MUX 404, an equal comparator 406, two inverters 408, a 4-input multiplexer 410, a 2-input OR gate 412, and a range comparator 414. The mask decoder 402 can decode mask bits into control signals for the source and output of the equal comparator 406 and range comparator 414. In one implementation, the range comparator 414 is optional for a predefined, global range for either each string field or each string signature. In one implementation, m range comparators 414 can be used for supporting m predefined, global ranges. In another implementation, a unit match 416 can be sent out after performing a logic OR with a "don't care" bit.

Figure 4C:
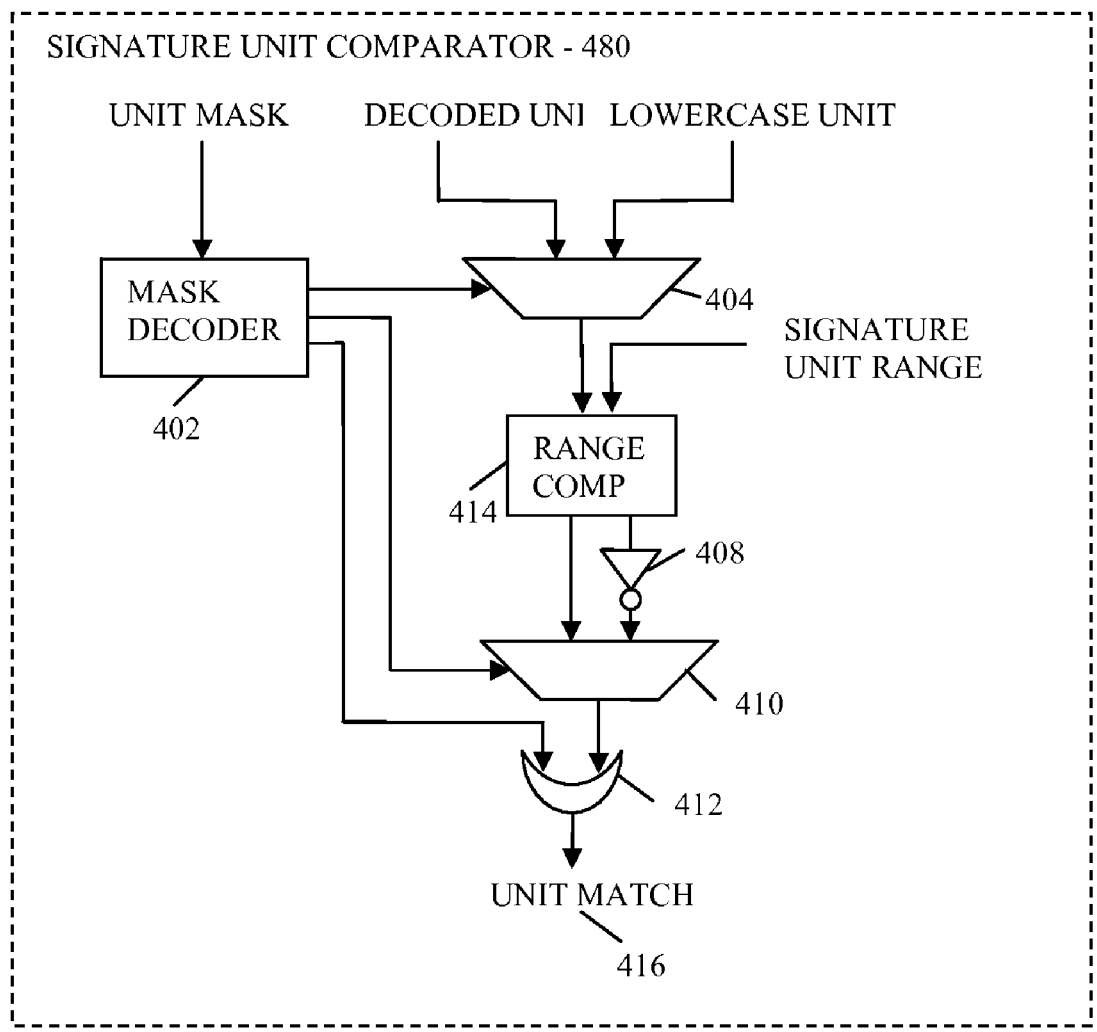
FIG. 4C illustrates block diagrams of an example signature unit comparator for use with a local signature unit range.

Multiple signature unit comparators 400 and a multiple input AND gate 452 can be used to build a signature segment comparator 450. The unit of data used by the signature segment comparator 450 is typically a byte, but can also be a nibble or any other size. In another implementation, the signature unit comparator 400 can be replaced by a signature unit comparator 480, as illustrated in FIG. 4C, to support a local signature unit range. Each masked unit in the signature seg 352 can be expanded into a masked unit range, or a masked pair of units that specify the lower and upper bounds of the signature unit.

Figure 5A:
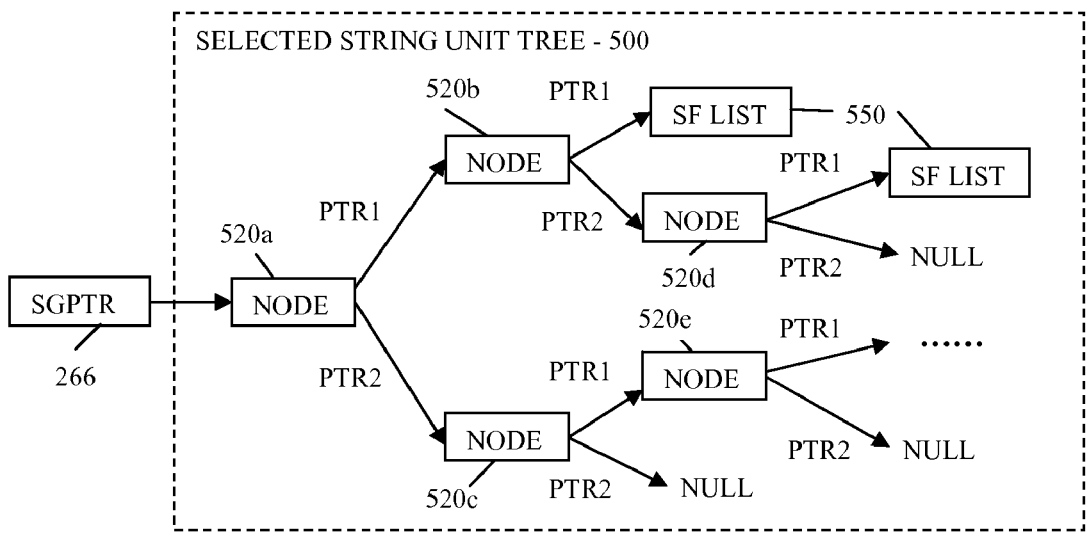
FIGS. 5A-C illustrates example data structures of a selected unit tree and a signature family list for fixed-size signature searching.

In one implementation, multiple signature lists can be searched by the fixed-size signature search engine 160 (FIG. 1). However, the probability of searching multiple signature lists is typically very low. Differential encoding, in which the signatures in a signature group are encoded against each other, can be used when searching multiple signature lists. For example, in one implementation, a selected string unit tree 500, as illustrated in FIG. 5A, can be designed as a search data structure for the signature finder 162 (FIG. 1). Selected string unit tree 500 includes nodes 520a-520e. At each node 520 of the selected string unit tree 500, there can be two branches, one matched branch pointed by ptr1 530 and another unmatched branch pointed by ptr2 532.

Figure 5B:
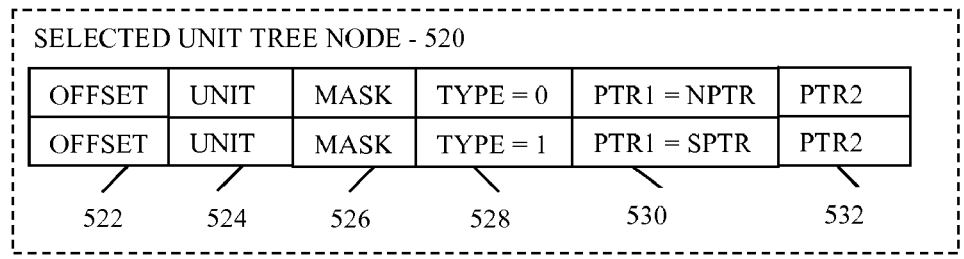

As shown in FIG. 5B, there can be two different types of nodes in the selected string unit tree 500, as illustrated by selected unit tree node 520: a leaf node in which the type 528 has a value of 1 and a non-leaf node in which the type 528 has a value of 0. For a non-leaf node, the matched branch always points into another node 520 in the tree and the unmatched branch points into either another node 520 in the tree or NULL. For a leaf node, the matched branch always points into a signature family list 550, shown in FIG. 5C, and the unmatched branch points into either another node 520 in the tree or NULL.

In one implementation, as illustrated in FIG. 5B, each node 520 of the selected string unit tree 500 includes an offset 522, a unit 524, a mask 526, a type 528, a ptr1 530, and a ptr2 532. The type 528 includes a type for the leaf and non-leaf nodes described above. The selected string unit 524 can correspond to any location within a string signature and the location can be given by either the offset 522 in the previous node 520 if the node 520 is not the root of the tree (e.g., the previous node of node 520b is node 520a, but node 520a does not have a previous node because node 520a is the root of the string unit tree 500), or the offset 270 in the matched fingerprint bucket list element 250 (FIG. 2B) if the node 520 is the root of the tree (e.g., node 520a). Each selected string unit includes mask 526 that corresponds to the mask 354 in the signature list 350 (FIG. 3B).

There is at least one basic unit different for any two string signatures if one of the string signatures is not a substring of another string signature. A string unit 524 can therefore be selected to differentiate at least two string signatures so that at least one signature can be eliminated by matching the string unit 524. Ambiguity among the signatures having at least one different basic unit can be resolved by searching through the selected string unit tree 500. The selected string unit tree 500 is illustrated in one implementation as a binary tree. In one implementation, a corresponding k-nary selected string unit tree can also be constructed. In one implementation, k units in a unit location from k signatures in a signature group can be used in each node of the k-nary tree, although more than one basic unit or a substring from a single signature can also be used in each node of the k-nary tree.

In one implementation a string signature can be a substring of another string signature. The signatures that have child-parent relationships can be indistinguishable to the selected string unit tree 500. In one implementation, no further scan is required after detecting any one of the signatures, thus is not necessary to distinguish between string signatures and substrings of a string signature. As a result, only the shortest substring is scanned. However, in another implementation, distinguishing between each of the signatures or identifying a longest signature is needed.

Figure 5C:
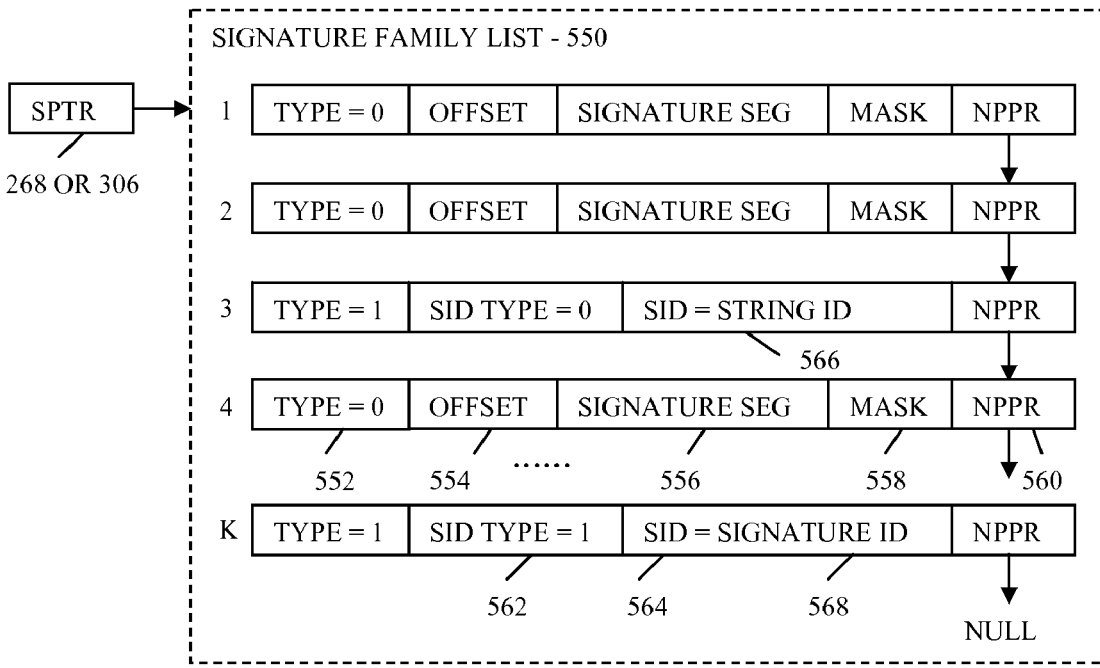

To support a family of signatures that has child-parent relationships, in one implementation, a signature family list 550, as illustrated in FIG. 5C, is provided as a search data structure for the signature verifier 164 (FIG. 1). Each element of the signature family list 550 includes a type 552, an offset 554, a signature segment 556, a mask 558, a nptr 560, a sid type 562, and a sid 564. In one implementation, to support a family of signatures, the signature family list 550 has two types of elements: a search element with the type 552 has a value of 0 and a result element with the type 552 has a value of 1. At each search element, a fixed-size signature segment 556 is compared according to the mask 558. The signature segment 556 and mask 558 are the same as those in the signature list 350 (FIG. 3B). However, there is no signature segment comparison for the result elements.

In one implementation, the system searches for all matched signatures. For each matched signature, a sid 564 is returned. However, the signature search continues for a matched signature's parents until a tail of the signature family list 550, where the nptr 560 has a NULL value, is reached. There are two types of the sid 564: a signature ID 568 and a string ID 566. The type of the sid 564 is given by the sid type 562. When the sid type 562 has a value of 0, the sid 564 is the string ID 566 for a substring of a variable-size string signature; otherwise, the sid 564 is the signature ID 568 for a fixed-size string signature.

In one implementation, the signature family list 550 is linked from the youngest generation, or the shortest substring, to the oldest generation, or the longest substring of the family. The offset 554 specifies the offset from a header of a current signature segment 556 to the header of a next signature segment 556. The searching of the signature family list 500 can be stopped, if no match is found. Specifying the offset between signature segments can allow for early termination of the searching by identifying a mismatch.

In one implementation, the signature family list 550 can only support a single signature in each generation of a signature family. If there are more than one signatures in one particular generation, multiple signature family lists 550 are used, one for each signature in the particular generation. Each multiple signature family list 550 can be distinguished by the selected string unit tree 500.

In another implementation, the mask encored signatures can be stored and scanned in one or more storage devices including a content addressable memory (CAM).

Variable-Size Signature Scanning

Referring back to FIG. 1, the fixed-size signature search engine 160 returns the string IDs, their sizes and locations within the string field for all the fixed-size substrings of all the variable-size signatures in the scan order. Using the information from the identified fixed-size substrings, the variable-size signature search engine 180 synthesizes the identified fixed-size signature substrings into any variable-sized signatures. In one implementation, one or more finite automata (FA) are used for the fixed-size signature substring synthesizing. In another implementation, the variable-size signature search engine 180 includes a signature rule lookup engine 182, a signature state verifier 184, a signature rule database 186, and a signature state table 188. The signature rule database 186 defines static rules for synthesizing fixed-size substrings of a variable-size signature into the variable-size signature. The signature state table 188 dynamically stores all the states for the syntheses processing for an input string field.

The signature rule lookup engine 182 identifies the signature rules associated with the matched string IDs from the signature rule database 186 and provides the associated signature rules to the signature state verifier 184. The signature state verifier 184 synthesizes the matched strings into any variable-size string signatures according to the signature rules and updates the signature state table 188.

Figure 6:
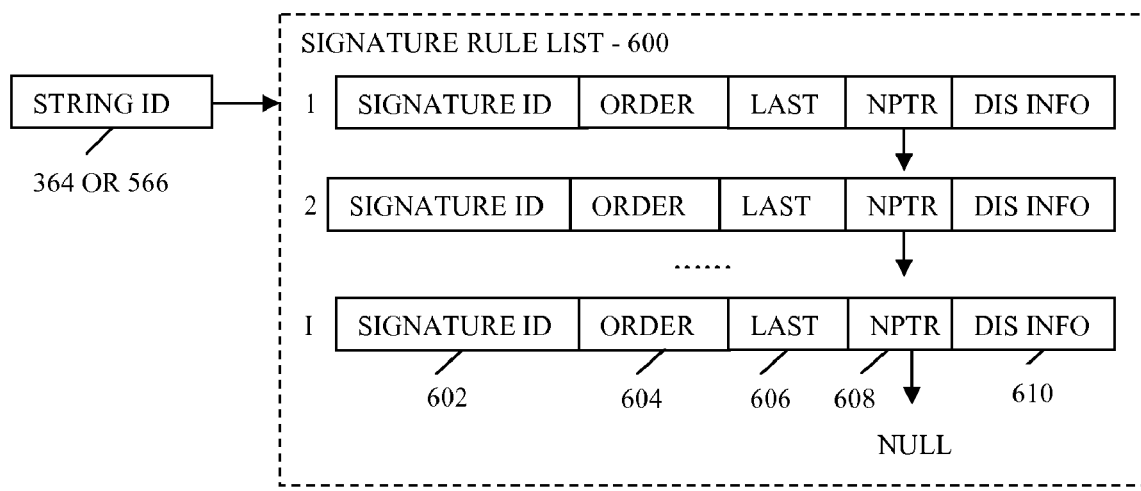
FIG. 6 illustrates an example data structure of a signature rule list for variable-size signature searching.

There are various data structures for the signature rule database 186 and the signature state table 188. In one implementation, as illustrated in FIG. 6, the signature rule database 186 can be implemented as a signature rule list 600. The signature rule list 600 can be indexed by a string ID from the fixed-size signature search engine 160. Multiple variable-size string signatures can contain the same substring. The signature rule list 600 can link together all the variable-size string signatures that contain a particular substring given by the string ID.

In one implementation, each element of the signature rule list 600 corresponds to a variable-size string signature. Each element includes a signature ID 602, an order 604, a last flag 606, a next element pointer ("nptr") 608, and a distance range information ("dis info") 610. The signature ID 602 identifies a particular variable-size string signature. The order 604 specifies an order of the substring given by the string ID among all the substrings of the variable-size string signature. The last flag 606 indicates whether or not the substring given by the string ID is the last substring of the variable-size string signature. The last flag 606 indicates the completion of the variable-size string signature search processing. The nptr 608 is a next pointer that points to a next element of the signature rule list 600. The dis info 610 is an optional field specifying a distance range between a current substring and a next substring (i.e., the minimum and maximum numbers of basic units between the two substrings). The dis info 610 can be omitted or reduced to a minimum distance or a maximum distance, for example, in situations where the range or the maximum or minimum distance is pre-defined or infinite.

In another implementation, each element of the signature rule list 600 can include one or more additional fields for specifying one or more variable-size signature substrings between two or more fixed-size signature substrings. For example, either a "pattern" or a "pattern pointer" and a "pattern" can be added into each element of the signature rule list 600 for a variable-size signature substring that repeats to fill the gap specified by the dis info 610.

Figure 7:
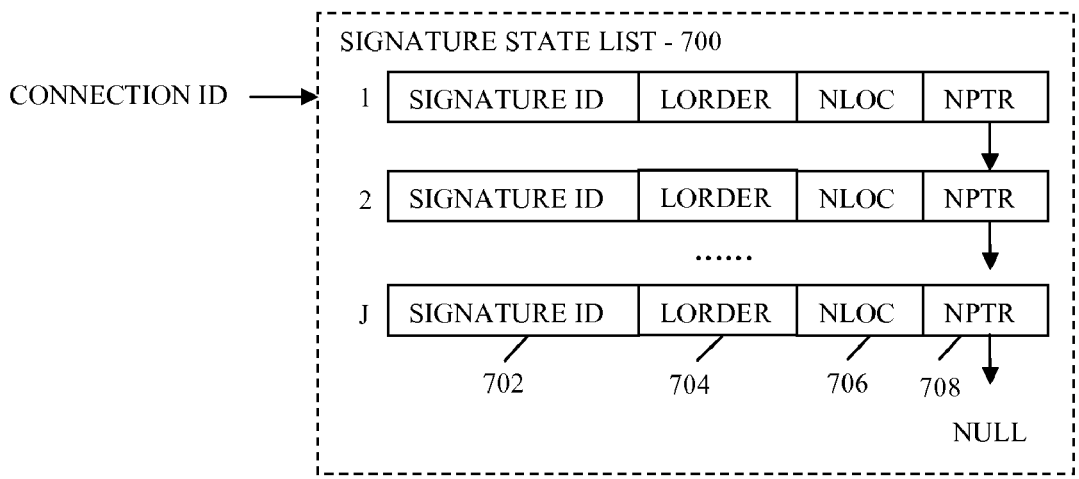
FIG. 7 illustrates an example data structure of a signature state list for a particular string field.

In one implementation, as illustrated in FIG. 7, the signature state table 188 can be implemented as one or more signature state lists 700. Each signature state list 700 can dynamically store signature states for all the substrings of all the variable-size string signatures identified for a string field of a particular connection. Each element of the signature state list 700 includes a signature ID 702, a last string order ("lorder") 704, a next string location ("nloc") 706, and a next element pointer ("nptr") 708. The signature ID 702 is an identification of a particular variable-size string signature. The lorder 704 is an order of a particular substring given by a last string ID for the particular variable-size string signature. The nloc 706 is a valid location range for the substring given by a next string ID for the particular variable-size string signature.

In one implementation, each string field of each individual connection has a signature state list 700. Typically, at each period of time, for each individual connection, only one string field is being scanned and there is only one signature state list 700. The signature state list 700 can include an entire valid history of all matched substrings of all the variable-size string signatures for a string field of a particular connection.

The signature state list 700 can be dynamic. In one implementation, a new element can be inserted into a signature state list 700 for a string field of a particular connection, if the substring given by the string ID is a first substring of a variable-size string signature, where the order 604=1, and there is no existing element for the particular variable-size string signature. An element of the signature state list 700 scan be deleted, if a current string header location is not within a valid range specified by the nloc 706 or if a timeout occurs. An element of the signature state list 700 can also be deleted after a matched variable-size string signature is found based on the element. In one implementation, all the elements of the signature state list 700 for a string field of a particular connection can be deleted at the end of the string field.

Referring back to FIGS. 1 and 6, in one implementation, the signature rule lookup engine 182 receives a string ID from the fixed-size signature search engine 160. The signature rule lookup engine 182 searches through the entire signature rule list 600 identified by the string ID and sends information (e.g., {signature ID 602, order 604, last 606, dis info 610}) from each element of the signature rule list 600, along with information from the fixed-size signature search engine 160 (e.g., {string header location, string size, connection ID, string field ID}), to the signature state verifier 184 sequentially, until a tail of the string rule list 600 (i.e., where the nptr 608 has a NULL value) is reached.

For each element in the signature rule lookup engine 182, the signature state verifier 184 searches through the signature state list 700 pointed to by the connection ID. For each element of the signature state list 700, if the signature ID 602 and signature ID 702 are the same, the order 604 has a value equal to the value of the lorder 704+1, and the string header location is within the valid range specified by the nloc 706, a match is found. For each matched element of the signature state list 700, the signature ID 602 is returned and the element is deleted, when the last flag 606 has a value of 1; otherwise, the element is updated as the lorder 704 having a value equal to the value of the order 604 and the nloc 706 having values equal to sums of the string header location, the string size, and the values of the dis info 610. No action is performed on the element when a match is not found.

In one implementation, the signature state list 700 can perform the scanning when the signature state list 700 is short and only one string field is being scanned for a particular connection at a particular time. However, if the signature state list 700 is long or multiple string fields are scanned for a particular connection at a particular time, other search data structure can be used for the signature state table 188. In one implementation, the signature state table 188 can be a signature state bloom filter or a signature state hash table, similar to the data structure in FIGS. 2A-2C. The hash key of the signature state bloom filter or a signature state hash table is a 3-tuple {connection ID, string field ID, signature ID}. In one implementation, the string field ID is not used when only one string field is being scanned for each connection at a particular time.

Figure 8:
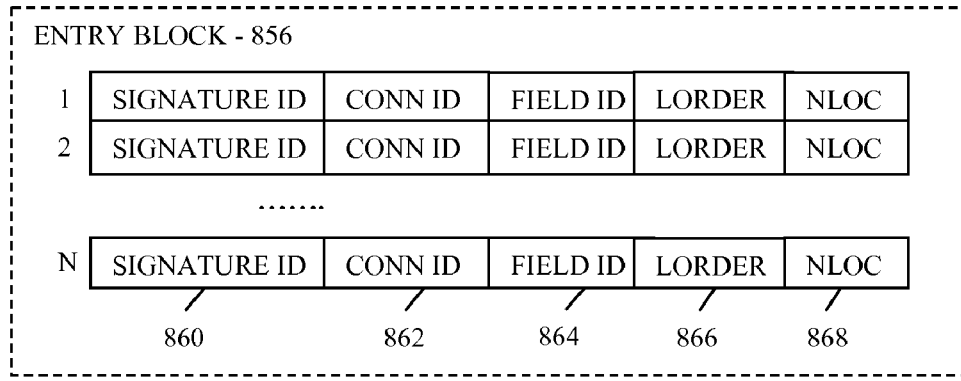
FIG. 8 illustrates an example data structure of an entry block indexed by a signature state bloom filter or hash table.

In one implementation, a data structure replaces the entry block 256 of FIGS. 2A-2C with a new entry block 856, as illustrated in FIG. 8. Each element of the entry block 856 includes a signature ID 860, a connection ID ("conn ID") 862, a field ID 864, a last string order ("lorder") 866, and a next string location ("nloc") 868. The hash key 3-tuple {signature ID 860, conn ID 862, field ID 864}, can be stored to resolve any hash collisions, while the lorder 866 and nloc 868 have the same definition as the lorder 704 and nloc 706 described above with respect to FIG. 7.

At each entry of the entry block 856, if an original key is the same, order 604 has a value equal to the value of the lorder 866+1, and the string header location is within a valid range specified by the nloc 868, a match is found. The signature ID 602 can be returned and the element can be deleted when a matched entry is found and the last 606 has a value of 1. When a matched entry is found, but the last flag 606 has a value of 0, the entry can be updated as lorder 866 has a value equal to the value of the order 604 and the nloc 868 has values equal to sums of the string header location, the string size, and the values of the dis info 610. If no match is found, the element can remain unchanged.

In one implementation, when the order and the distance range between two consecutive fixed-size signature substrings match one or more elements of the signature rule list 600, the signature state verifier 184 further verifies the string between the two consecutive fixed-size signature substrings in the string field against the one or more variable-size signature substrings specified by the one or more elements of the signature rule list 600. The signature state list 700 is updated with the new fixed-size signature substring when the string between the two consecutive fixed-size signature substrings in the string field matches a variable-size signature substring specified by the one or more elements of the signature rule list 600.

Scan System Design and Performance

In one implementation, a speed of the fast string signature scan engine 100 can be limited by a speed of the fingerprint scan engine 140, for example, if the false positive is sufficient small and the later scanning stages are properly designed. When the fingerprints are scanned both as a whole and sequentially on different lengths, the speed of the fingerprint scan engine 140 can depend on a combination of the scan step size, the number of unique lengths of fingerprints, and the clock rate. In one implementation the speed of the scan engine 100 is substantially $(s/m)*R$, where the s is the scan step size, the m is the number of lengths of fingerprints, and the R is the clock rate. For example, if the scan step size is 8 bytes, the fingerprint lengths are 4, 8, 16, and 32 bytes, and the clock rate is 500 MHz, the scan speed of a single scan engine 100 is substantially $(8/4)*500$ MB/s=8 Gbits/s.

In another implementation, if the fingerprints are scanned in segments in parallel and synthesized sequentially for the at-least-one match and the segment size is the same as the scan step size, the scan speed of a single scan engine 100 is substantially $s*R$. In one implementation, the scan engine 100 can scan a string field at 32 Gbps when s and R have the same values as in the previous example. Additionally, in another implementation, the scan step size and thus the scan speed can be further increased by n times when the fingerprints are scanned in segments and the segments are synthesized in parallel, where n is the number of segments scanned and synthesized in parallel. For the same s and R as in the previous example, the scan engine 100 can scan a string field at 128 Gbps using a scan step size of 32 bytes when 4 segments are scanned and synthesized in parallel or n=4.

The scan speeds discussed above are the speed for a single signature scan engine. In one implementation, the scan speed can be further increased by multiple times when multiple signature scan engines are used in parallel.

In one implementation, the architecture and parameters of a signature scan system can be selected based on one or more of a string signature scan speed, sizes of the fixed-size signatures or fixed-size substrings of variable-size signatures, similarity among the signatures or signature substrings, and the size of the signature database, to ensure that the fingerprint scan engine 140, the fixed-size signature search engine 160, and the fixed-size signature search engine 180 can meet a particular scan system's requirements. For example, the scan step size can be selected based on the system requirements. As shown in TABLE 1, the larger the scan step size, the faster the scanning is performed by the fast string signature scan engine 100. However, there is also an increase in the minimum size of fixed-size string signature and signature substrings, as well as the more the insertions and deletions. Large scan step size can also limit the choices of the fingerprints for each signature and increasing the probability of collisions and false positive results.

TABLE 1

| SCAN STEP SIZE SELECTION | | | |
| --- | --- | --- | --- |
| SCAN STEP SIZE | SPEEDUP FACTOR | MINIMUM SIZE OF FIXED-SIZE SIGNATURE | NUMBER OF INSERTIONS AND DELETIONS |
| 1 | 1 | 1 | 1 |
| 2 | 2 | 3 | 2 |
| 3 | 3 | 5 | 3 |
| n | n | 2 * n − 1 | n |

Additionally, the scan step size and thus the scanning speed can be particularly limited by the minimum size of the fixed-size string signatures and signature substrings. In one implementation, to avoid scanning short string signatures separately, the scan step size can be selected based on the minimum size of the fixed-size string signatures or signature substrings according to TABLE 1.

TABLE 1 assumes that every basic unit of all fixed-size signatures and signature substrings can be used for fingerprints. In one implementation, every fixed-size signature or signature substring is a fully specified at least in one shadow space. Alternatively, in some other implementations, the scan step size and thus the scanning speed can be further limited by the minimum size of the fully specified shadows of all fixed-size signatures or signature substrings. Consequently the title of the 3$^{rd}$ column of TABLE 1 can become "minimum size of fully specified shadows of all fixed-size signatures or signature substrings".

In another implementation, to increase the scan speed, a larger scan step size can be selected. The string signatures that are shorter than what can be scanned by the scan step size can then be scanned separately, for example, using scanning methods described above or any other scan method. Increasing the scan step size can be effective when only a small number of fixed-size string signatures or signature substrings are short.

In another implementation, the number of engines in different pipelining stages can be different. The engines can be selected according to the particular system's requirements. For example, for a particular system, the configuration can use one preprocessing engine 120, four fingerprint scan engines 140, one fixed-size signature search engine 160, and two variable-size signature search engines 180.

In one implementation, multiple fingerprint scan engines 140 are used such that each of the fingerprint scan engine 140 covers a list of fingerprint lengths for providing multiple resolution fingerprint scanning. In one implementation, all fingerprints are segmented into segments of a same length and all the fingerprint segments are scanned using a same scan step size. The number of fingerprint scan engines covering each list of fingerprint lengths can be the same for all lists of fingerprint lengths.

In another implementation, fingerprints are segmented into segments of different lengths and fingerprint segments of different lengths are scanned using different scan step sizes according to the average length of the fingerprints in a list of fingerprint lengths such that a longer fingerprint segment and a larger scan step size are used for the fingerprints in a list of fingerprint lengths that has a longer average length, while a shorter fingerprint segment and a smaller scan step size are used for the fingerprints in a list of fingerprint lengths that has a shorter average length. For example, the fingerprint segment length and the scan step size can be 8 basic units for fingerprints of 8, 16, 24, 32, and 40 basic units, while the fingerprint segment length and the scan step size can be 2 basic units for fingerprints of 2, 4, and 6 basic units.

In order to balance scan speeds of fingerprint scan engines that support for different fingerprint segment lengths using different scan step sizes, in one implementation, more fingerprint scan engines 140 can be used for shorter fingerprint segments scanned in a smaller scan step size than those for longer fingerprint segments scanned in a larger scan step size. In another implementation, in order to balance scan speeds of fingerprint scan engines that use memories of different speeds, more fingerprint scan engines 140 can be used when a slower memory is used than those when a faster memory is used. In general, in another implementation, the number of fingerprint scan engines can be selected based on the product of a scan step size and a memory speed. More fingerprint scan engines can be used for a smaller product of a scan step size and a memory speed than those for a larger product of a scan step size and a memory speed.

In one implementation, multiple fingerprint scan engines 140 having a same scan step size cover non-overlapping, interleaving locations within an input string field for a same plurality of fingerprints such that the resultant scan step size of the multiple fingerprint scan engines is the product of the number of the fingerprint scan engines and the original scan step size of a single fingerprint scan engine. For example, to provide a same scan speed, the number of fingerprint scan engines having a scan step size of 2 units can be 4 times of the number of fingerprint scan engines having a scan step size of 8 units.

In another implementation, multiple fingerprint scan engines 140 having a same scan step size cover partially overlapping, interleaving locations within an input string field for a same plurality of fingerprints such that the resultant scan step size of the multiple fingerprint scan engines is larger than the original scan step size of a single fingerprint scan engine, but less than the product of the number of the fingerprint scan engines and the original scan step size of a single fingerprint scan engine.

In one implementation, the fingerprint databases 148 for different fingerprint segment lengths can be stored in memories of different speeds such that the memories used for shorter fingerprint segments are faster than the memories used for longer fingerprint segments. In one implementation, the fixed-size signature database 166 for different lists of fingerprint lengths can be stored in memories of different speeds such that the memories used for a list of fingerprints that are shorter in average are faster than the memories used for a list of fingerprints that are longer in average.

In one implementation, the fingerprint database 148 for fingerprints shorter than a particular length (e.g. 9 basic units) is stored in one of the fastest memories in the scanning system (e.g., on-chip memory or CPU cache). In one implementation, the entire or a portion of fixed-size signature database 166 that is for fingerprints shorter than the particular length are stored in one of the fastest memories in the scanning system along with the fingerprint database 148. In another implementation, multiple fingerprint scan engines for a same list of fingerprints can share a fingerprint database 148 stored in a multiple-port memory.

In one implementation, one or more engines in different pipelining stages discussed above can be replaced by any other scanning methods. For example, in one implementation, a content addressable memory (CAM) is used for scanning the shadows of the fingerprints as the fingerprint scan engine 140 does, while a fixed-size signature search engine 160 and a variable-size signature search engines 180 are used for further signature scanning. In another implementation, a CAM can be used for scanning one or more fingerprints in an original space as the fingerprint scan engine 140 does. In one implementation, a deterministic or non-deterministic finite automaton (DFA or NFA) can be used for synthesizing fingerprint segments as a fingerprint synthesis engine 150 does. In another implementation, a DFA or NFA can be used for synthesizing fixed-size signature substrings into variable-size signatures as a variable-size signature search engines 180 does.

Other implementations can be performed on other strings of data. For example, biological system such as a sequence of genetic code can be used as a string field. Signatures describing specific genetic sequences can be used to identify particular genetic sequences from a string field of genetic data. For example, particular genes can be identified by a particular signature and scanned for using the scanning engine.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., a FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 9:
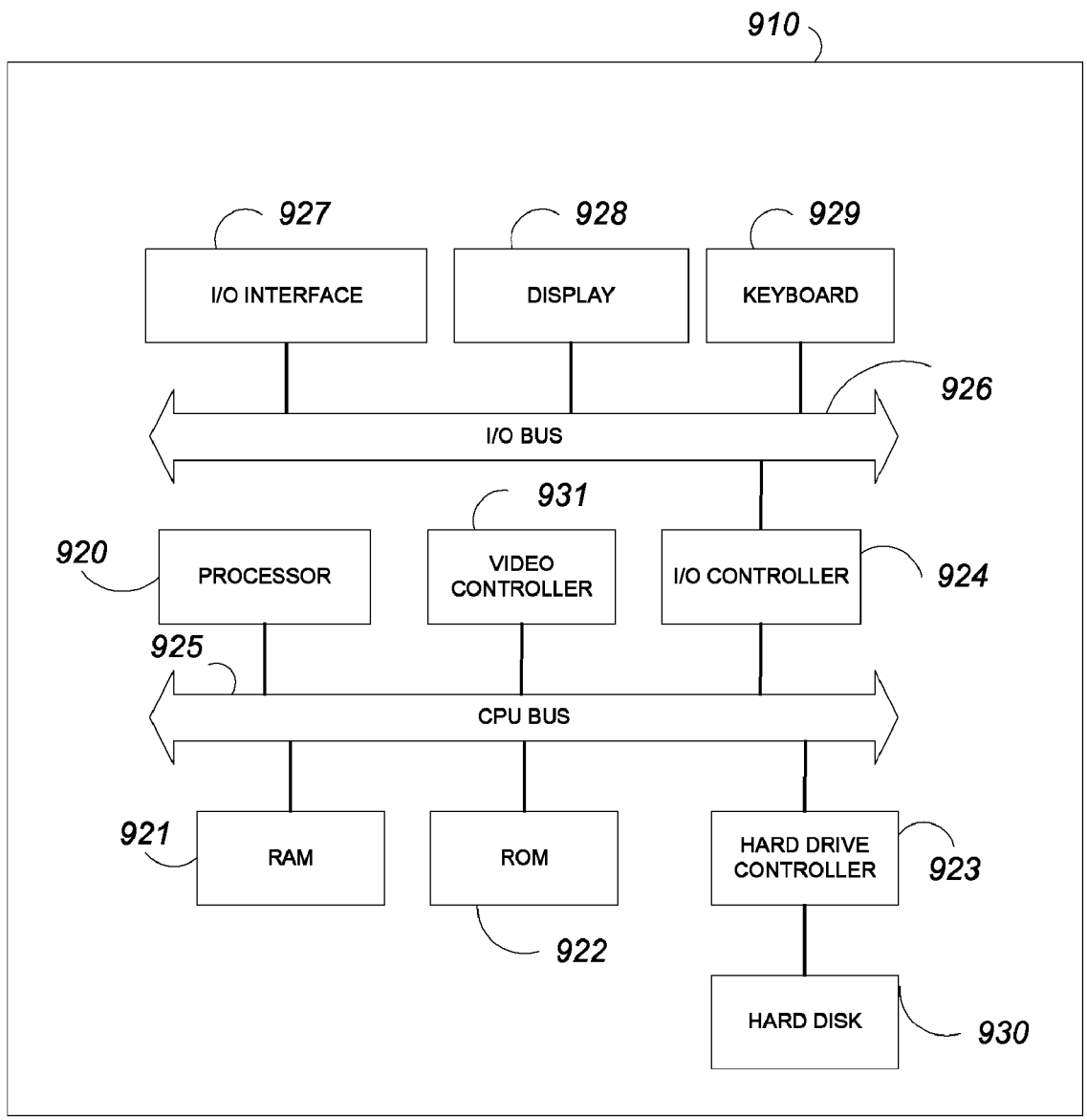
FIG. 9 illustrates an example computer system.

An example of one such type of computer is shown in FIG. 9, which shows a block diagram of a programmable processing system (system) 910 suitable for implementing or performing the apparatus or methods of the invention. The system 910 includes a processor 920, a random access memory (RAM) 921, a program memory 922 (for example, a writable read-only memory (ROM) such as a flash ROM), a hard drive controller 923, a video controller 931, and an input/output (I/O) controller 924 coupled by a processor (CPU) bus 925. The system 910 can be preprogrammed, in ROM, for example, or it can be programmed (and reprogrammed) by loading a program from another source (for example, from a floppy disk, a CD-ROM, or another computer).

The hard drive controller 923 is coupled to a hard disk 930 suitable for storing executable computer programs.

The I/O controller 924 is coupled by means of an I/O bus 926 to an I/O interface 927. The I/O interface 927 receives and transmits data (e.g., stills, pictures, movies, and animations for importing into a composition) in analog or digital form over communication links such as a serial link, local area network, wireless link, and parallel link.

Also coupled to the I/O bus 926 is a display 928 and a keyboard 929. Alternatively, separate connections (separate buses) can be used for the I/O interface 927, display 928 and keyboard 929.

The invention has been described in terms of particular embodiments. Other embodiments are within the scope of the following claims. For example, the steps of the invention can be performed in a different order and still achieve desirable results.

What is claimed is:

1. A method for string signature scanning, comprising:
  processing one or more signatures into one or more formats including selecting one or more fingerprints for each fixed-size signature or each of one or more fixed-size signature substrings of each a variable-size signature and constructing one or more search data structures for the one or more fingerprints associated with the one or more signatures and one or more follow-on search data structures, each successive fingerprint of a particular fixed-size signature or signature substring having a first basic unit in a scanning direction that is shifted one or more units from the previous fingerprint of the particular fixed-size signature or signature substrings such that the number of fingerprints for the particular fixed-size signature or signature substrings is equal to a step size for a signature scanning operation and the particular fixed-size signature or signature substring is identifiable at any location within any string fields to be scanned, where each fingerprint includes one or more fragments of a particular fixed-size signature or signature substring, the one or more fragments having particular locations anywhere within the particular fixed-size signature or signature substring;
  receiving a particular string field comprising a string of data values;
  identifying any signatures included in the particular string field including scanning the particular string field for the one or more fingerprints associated with the one or more signatures with either a zero or non-zero false positive rate using the one or more search data structures for the one or more fingerprints for each scan step size and searching the particular string field for the one or more signatures associated with one or more identified fingerprints using the one or more follow-on search data structures at the locations where the one or more identified fingerprints are found; and outputting any identified signatures in the particular string field.

2. The method of claim 1, where a plurality of fingerprints are selected for each fixed-size signature or each of one or more fixed-size signature substrings of each variable-size signature.

3. The method of claim 1, where each fingerprint of the one or more fingerprints associated with the one or more signatures is fully specified either originally or after mapping it into one or more shadow spaces where the shadow spaces are spaces that correspond to a generalized format from the original space where the shadow spaces are spaces that introduce some ambiguity to the original space such that a single fingerprint in a particular shadow space corresponds to one or more fingerprints in the original space.

4. The method of claim 1, where scanning the particular string field for the one or more fingerprints associated with the one or more signatures further includes scanning using one or more of one or more hash tables, one or more bloom filters, one or more hash tables with one or more of a hash value de-multiplexer and a fingerprint length de-multiplexer, and one or more bloom filters with one or more of a hash value de-multiplexer and a fingerprint length de-multiplexer.

5. The method of claim 1, where the one or more fingerprints are selected such that their lengths are limited to a length list that covers one or more lengths within one or more ranges of lengths providing multiple resolution fingerprint scanning.

6. The method of claim 1, further comprising:
decomposing each fingerprint of one or more fingerprints associated with one or more signatures into one or more fingerprint segments;
scanning the particular string field for the plurality of fingerprint segments of the one or more fingerprints; and
synthesizing identified fingerprint segments into any fingerprint matches.

7. The method of claim 6, where synthesizing identified fingerprint segments into any fingerprint matches includes using one or more of a fingerprint segment bitmap specifying one or more possible locations within any fingerprints for a particular fingerprint segment, and fingerprint length information specifying one or more possible fingerprint lengths for a particular fingerprint segment.

8. The method of claim 1, further comprising:
constructing a differential search structure for a plurality of fixed-size signatures or signature substrings associated with one or more a fingerprint; and
searching for a plurality of fixed-size signatures or signature substrings associated with one or more identified fingerprint differentially.

9. The method of claim 1, further comprising:
encoding each of one or more fixed-size signatures or signature substrings with one or more mask bits including one or more mask bits for specifying one or more of a don't care, a case-sensitivity, a negation, a pre-defined range, a logic operation, and an arbitrary range; and
comparing the mask encoded fixed-size signatures or signature substrings with the particular string field.

10. The method of claim 1, further comprising:
decomposing each of one or more variable-size signatures into a plurality of fixed-size signature substrings and one or more variable-size signature substrings and building one or more data structures for synthesizing the fixed-size signature substrings of the one or more variable-size signatures into the variable-size signatures; scanning the particular string field for the plurality of fixed-size signatures or signature substrings; and synthesizing identified fixed-size signature substrings into any variable-sized signatures at the location where one or more fixed-size signature substrings are identified.

11. The method of claim 10, where building one or more data structures for synthesizing the fixed-size signature substrings of the more or more variable-size signatures into the variable-size signatures includes building a static signature synthesis rule database that includes one or both of a signature identification and location information of each fixed-size signature substring including an order and a distance range to the next fixed-size signature substring; and synthesizing identified fixed-size signature substrings into any variable-sized signatures includes using the static signature synthesis rule database.

12. The method of claim 1, where each fingerprint of the one or more fingerprints associated with the one or more signatures is fully specified.

13. The method of claim 1, where the one or more search data structures for the one or more fingerprints associated with the one or more signatures includes one or more search data structures stored in one or more content addressable memories (CAM) and scanning the particular string field for the one or more fingerprints associated with the one or more signatures includes using the one or more content addressable memories (CAM).

14. A string signature scanning system, the system comprising:
a machine-readable storage device including a computer program; and
one or more processors or one or more special purpose logic circuits operable to execute the computer program, and perform operations including providing one or more modules including:
a signature pre-processing module operable to process one or more signatures into one or more formats including selecting one or more fingerprints for each fixed-size signature or each of one or more fixed-size signature substrings of each variable-size signature and constructing one or more search data structures for the one or more fingerprints associated with the one or more signatures and one or more follow-on search data structures, each successive fingerprint of a particular fixed-size signature or signature substring having a first basic unit in a scanning direction that is shifted one or more units from the previous fingerprint of the particular fixed-size signature or signature substrings such that the number of fingerprints for the particular fixed-size signature or signature substrings is equal to a step size for a signature scanning operation and the particular fixed-size signature or signature substring is identifiable at any location within any string fields to be scanned, where each fingerprint includes one or more fragments of a particular fixed-size signature or signature substring, the one or more fragments having particular locations anywhere within the particular fixed-size signature or signature substring;

a fingerprint scan engine operable to identify one or more fingerprints associated with one or more signatures on an input string field, the identifying including scanning the input string field for the one or more fingerprints associated with the one or more signatures with either a zero or non-zero false positive rate using the one or more search data structures for the one or more fingerprints for each scan step size;

a signature search engine operable to identify signatures for the identified fingerprints.

15. The system of claim 14, each of one or more fingerprints of one or more lengths being decomposed into one or more fingerprint segments and the plurality of fingerprint segments for the one or more fingerprints being scanned by one or more fingerprint scan engines, each of the one or more fingerprint scan engines including a fingerprint synthesis engine that is operable to synthesize a plurality of fingerprint segments into any fingerprint matches either in parallel or sequentially using one or more of a fingerprint segment bitmap, fingerprint length information, and one or more content addressable memories (CAM).

16. The system of claim 14, where the signature search engine further includes a fixed-size signature search engine operable to identify fixed-size signatures or fixed-size substrings of variable-size signatures for identified fingerprints and a variable-size signature search engine operable to identify variable-size signatures including synthesizing identified fixed-size substrings into any variable-size signatures.

17. The system of claim 16, where the variable-size signature search engine is operable to synthesize identified fixed-size substrings of variable-size signatures into any variable-size signatures using a static signature synthesis rule database that includes one or both of a signature identification and location information of each fixed-size signature substring including an order and a distance range to the next fixed-size signature substring.

18. The system of claim 14, where a plurality of fingerprints are selected for each fixed-size signature or each of one or more fixed-size signature substrings of each variable-size signature.

19. The system of claim 14, where each fingerprint of the one or more fingerprints associated with the one or more signatures is fully specified either originally or after mapping it into one or more shadow spaces where the shadow spaces are spaces that correspond to a generalized format from the original space where the shadow spaces are spaces that introduce some ambiguity to the original space such that a single fingerprint in a particular shadow space corresponds to one or more fingerprints in the original space.

20. The system of claim 14, where the fingerprint scan engine includes using one or more of one or more hash tables, one or more bloom filters, one or more hash tables with one or more of a hash value de-multiplexer and a fingerprint length de-multiplexer, one or more bloom filters with one or more of a hash value de-multiplexer and a fingerprint length de-multiplexer, and one or more content addressable memories (CAM).

21. The system of claim 14, where the signature search engine includes a signature finder operable to identify any potential fixed-size string signatures on an input string field for one or more fixed-size string signatures associated with one or more identified fingerprints and a signature verifier operable to verify one or more potential fixed-size string signatures.

22. The system of claim 14, where the signature search engine is operable to compare signatures that are encoded with one or more mask bits with an input string field, the one or more mask bits including one or more mask bits for specifying one or more of a don't care, a case-sensitivity, a negation, a pre-defined range, a logic operation, and an arbitrary range.

23. A method for string signature scanning for one or more fully specified signatures, comprising:

processing one or more signatures into one or more formats including selecting a fingerprint for each signature, constructing one or more search data structures for the one or more fingerprints associated with the one or more signatures including hashing the fingerprints using one or more hash functions, and constructing one or more follow-on search data structures, where each fingerprint includes a fragment of a particular signature, the fragment having a particular location anywhere within the particular signature;

receiving a particular string field comprising a string of data values;

identifying any signatures included in the particular string field including scanning the particular string field for the one or more fingerprints associated with the one or more signatures at each scan location including hashing one or more data samples of the particular string field of one or more sizes of the one or more fingerprints using the one or more hash functions to generate one or more hash values and querying the one or more search data structures for the one or more fingerprints using the one or more hash values, and searching the particular string field for the one or more signatures associated with one or more identified fingerprints using the one or more follow-on search data structures at the locations where the one or more identified fingerprints are found including identifying any potential signatures included in the particular string field for the one or more signatures associated with the one or more identified fingerprints and comparing one or more identified potential signatures with the particular string field at the locations where the one or more identified potential signatures are found; and outputting any identified signatures in the particular string field.

24. The method of claim 23, where the one or more fingerprints associated with the one or more signatures have a same size and querying the one or more search data structures for the fingerprints using the one or more hash values includes checking one or more valid bits indexed by the one or more hash values.

25. A method for string signature scanning for one or more signatures that are not fully specified, comprising:

processing one or more signatures into one or more formats including selecting one or more fully specified fingerprints for each signature, constructing one or more search data structures that are stored in one or more memories including a content addressable memory (CAM) for the one or more fully specified fingerprints associated with the one or more signatures, and constructing one or more follow-on search data structures for identifying the one or more signatures including matching signature substrings that are not fully specified, where each fingerprint includes a fully specified fragment of a particular signature anywhere within the particular signature and each of the one or more follow-on search data structures is associated with a particular fingerprint;

receiving a particular string field comprising a string of data values;

identifying any signatures included in the particular string field including scanning the particular string field for the one or more fully specified fingerprints associated with the one or more signatures using the one or more search data structures for the one or more fully specified fingerprints including using a content addressable memory (CAM), and searching the particular string field for the one or more signatures associated with one or more identified fingerprints using one or more follow-on search data structures that are associated with the one or more identified fingerprints at the locations where the one or more identified fingerprints are found; and outputting any identified signatures in the particular string field.

26. The method of claim 25, where each fingerprint of the one or more fully specified fingerprints of a particular signature is a fully specified fragment that has no fully specified adjacent basic unit within the particular signature.

27. The method of claim 25, where searching the particular string field for the one or more signatures associated with one or more identified fingerprints includes comparing one or more signature basic units that are not fully specified with the particular string field.

28. The method of claim 25, where searching the particular string field for the one or more signatures associated with one or more identified fingerprints includes checking one or more size ranges for one or more variable-size signature substrings within the particular string field.

29. The method of claim 25, where searching the particular string field for the one or more signatures associated with one or more identified fingerprints includes combining the searching results with the one or more identified fingerprints to identify any signature matches.

30. A string signature scanning system for one or more signatures that are not fully specified, the system comprising:

a machine-readable storage device including a computer program; and one or more processors or one or more special purpose logic circuits operable to execute the computer program, and perform operations including providing one or more modules including:

a signature pre-processing module operable to process the one or more signatures into one or more formats including selecting one or more fully specified fingerprints for each signature, constructing one or more search data structures that are stored in one or more memories including a content addressable memory (CAM) for the one or more fully specified fingerprints associated with the one or more signatures, and constructing one or more follow-on search data structures for identifying the one or more signatures including matching signature substrings that are not fully specified, where each fingerprint includes a fully specified fragment of a particular signature anywhere within the particular signature and each of the one or more follow-on search data structures is associated with a particular fingerprint;

a fingerprint scan engine operable to identify one or more fully specified fingerprints associated with one or more signatures on an input string field using the one or more search data structures for the one or more fully specified fingerprints including using a content addressable memory (CAM); and a signature search engine operable to identify one or more signatures that are not fully specified and associated with the one or more identified fingerprints using the one or more follow-on search data structures that are associated with the one or more identified fingerprints.

* * * * *